US008229859B2

(12) United States Patent
Samid

(10) Patent No.: US 8,229,859 B2
(45) Date of Patent: Jul. 24, 2012

(54) BIT CURRENCY: TRANSACTIONAL TRUST TOOLS

(76) Inventor: Gideon Samid, Rockville, MD (US)

( * ) Notice: Subject to any disclaimer, the term of this patent is extended or adjusted under 35 U.S.C. 154(b) by 729 days.

(21) Appl. No.: 12/081,412

(22) Filed: Apr. 15, 2008

(65) Prior Publication Data

US 2008/0262969 A1    Oct. 23, 2008

Related U.S. Application Data

(60) Provisional application No. 60/907,869, filed on Apr. 19, 2007, provisional application No. 60/960,672, filed on Oct. 9, 2007.

(51) Int. Cl.
*G06Q 20/00* (2012.01)
*G06Q 40/00* (2012.01)

(52) U.S. Cl. ............... 705/69; 705/35; 705/39; 705/65; 705/41; 705/17; 713/159; 902/25; 902/26; 902/27; 902/28; 902/29

(58) Field of Classification Search .................. 705/69
See application file for complete search history.

(56) References Cited

U.S. PATENT DOCUMENTS

| 7,143,062 B2 * | 11/2006 | Turk et al. ............... 705/38 |
| 2007/0244812 A1 * | 10/2007 | Turk et al. ............... 705/39 |
| 2008/0147563 A1 * | 6/2008 | Yen et al. ............... 705/65 |
| 2008/0195499 A1 * | 8/2008 | Meredith et al. ......... 705/26 |

* cited by examiner

*Primary Examiner* — Evens J Augustin
*Assistant Examiner* — Murali Dega
(74) *Attorney, Agent, or Firm* — John R. Kasha; Kasha Law LLC

(57) ABSTRACT

Systems and methods are provided for utilizing a digital coin. A bit string is received. The number of bits in the bit string represents a coin value of the digital coin. The individual bit values of the bits of the bit string are used to determine an identity of the digital coin. The identity of the digital coin is validated by a node of an authentication hierarchy. The validation includes comparing bit values of at least a portion of the bits of the bit string to bit values of corresponding bits of known bit strings that represent known issued digital coins. The validation also includes checking that a matching known issued digital coin was not previously redeemed. A digital coin can also be split into multiple digital coins that are each a continuous sequence of bits of the bit string of the original digital coin.

16 Claims, 6 Drawing Sheets

Fig.-1

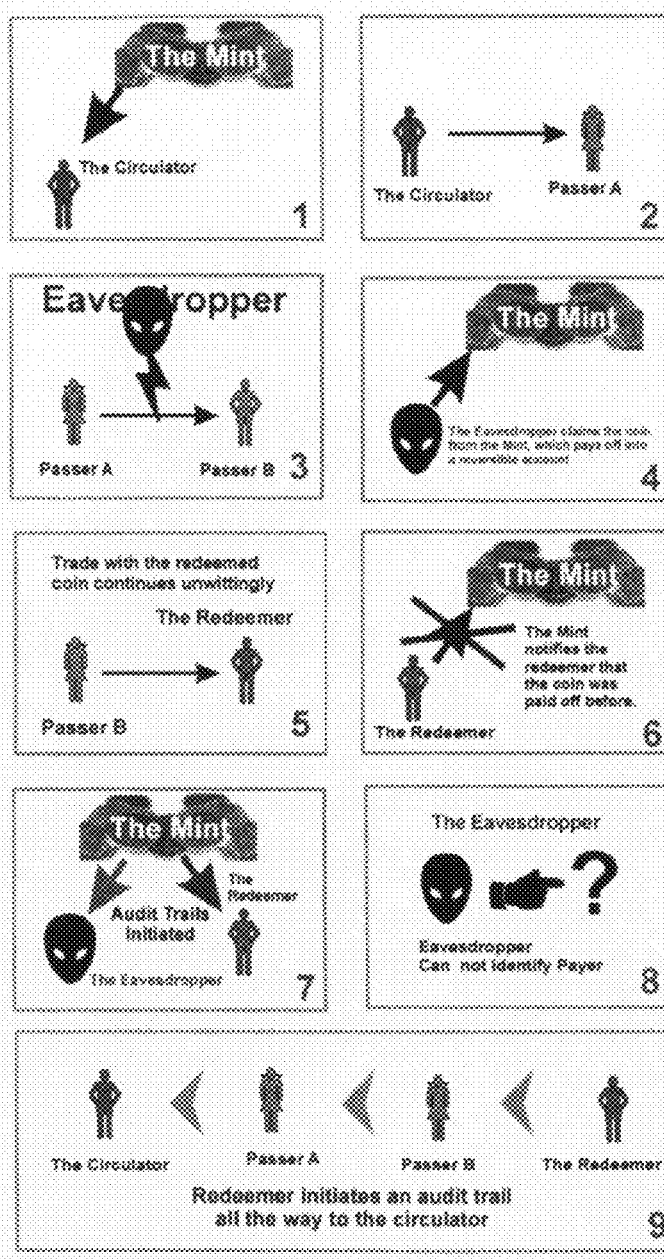

Figure 12:
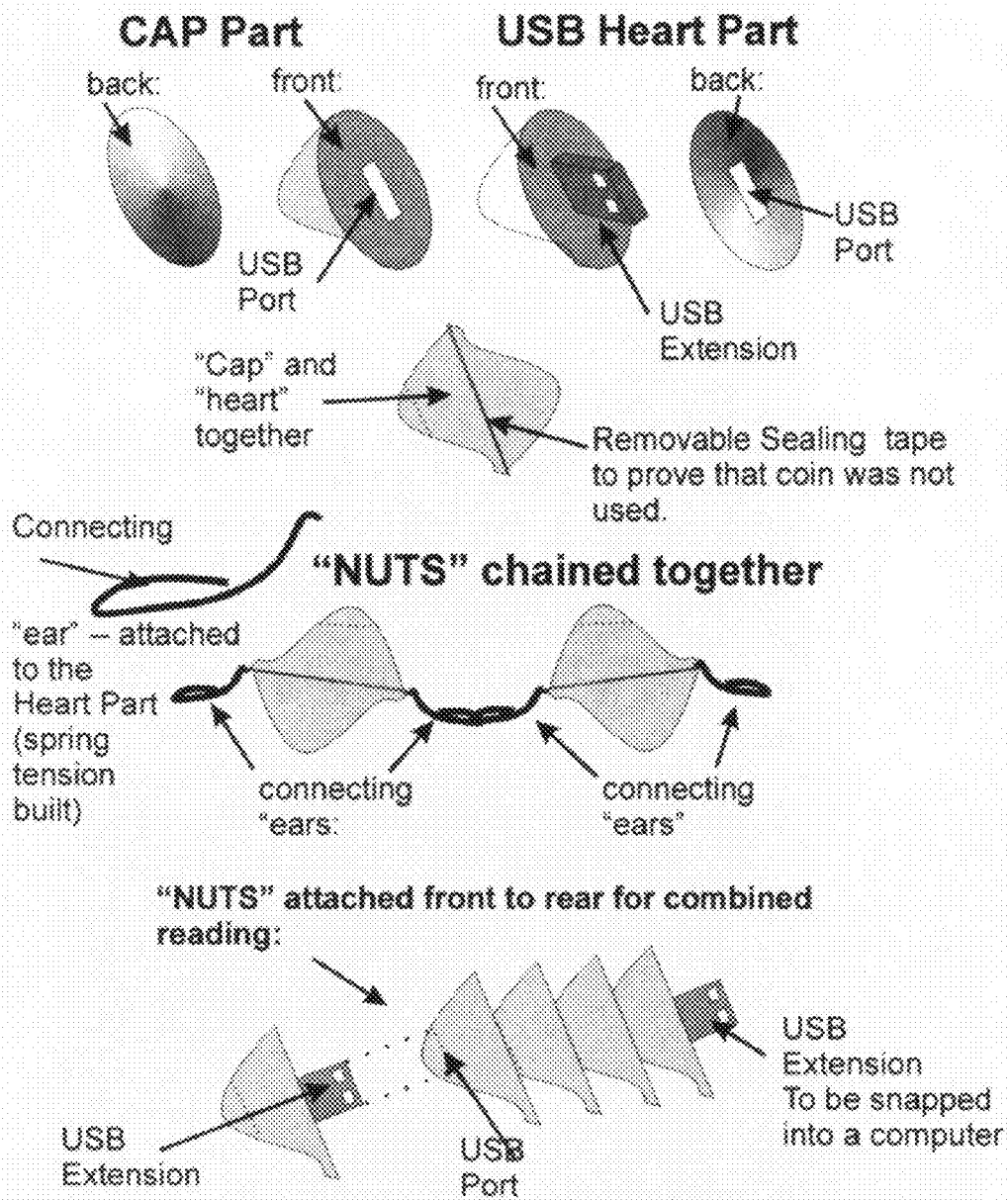

The Circulator circulates a digital coin [1], and passes it (email, SMS) to trader A (passer trader), [2]. Trader A passes the digital coin to trader B, but en route, an eavesdropper copies the coin, [3], and rushes to Mint to redeem it, [4]. The eavesdropper gets paid into a reversible account. Passer B is left unaware of the theft of the coin, and pays with it to the redeemer trader [5]. The redeemer attempts to cash the coin with the Mint, [6] and the Mint notifies him that the coin was redeemed before. The Mint demands from the eavesdropper and the Redeemer to identify who paid them the coin [7]. The eavesdropper can not comply, but the redeemer initiates an audit trail which traces the path of the coin all the way to the circulator, [9], and the redeemer gets the money.

Alpha Trade Security

Fig-2
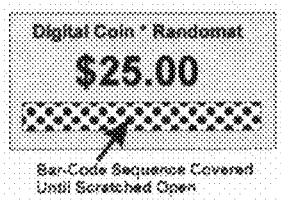
Fig-3 coin examples.
Fig. 4 coin sticks
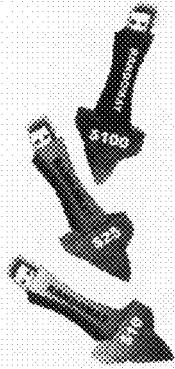
Fig.-5

Fig.-6
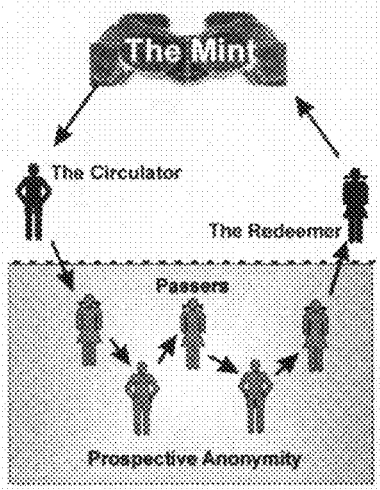
Alpha-Trade: All except the circulator of the digital coin, and its redeemer enjoy prospective anonymity
Fig.-7
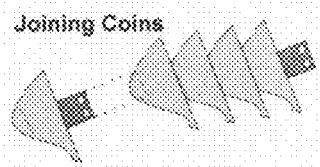
Each coin has a USB extension, and a USB socket facilitating physical joining on snapping to a computer readout.
Fig-8: CD held Reward Points
Fig.-9
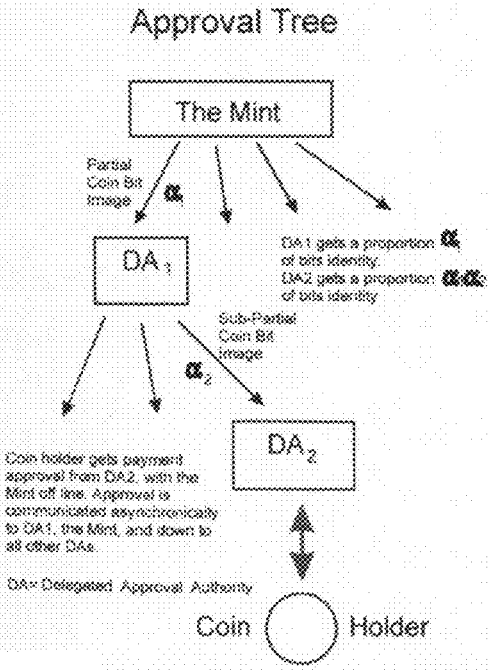

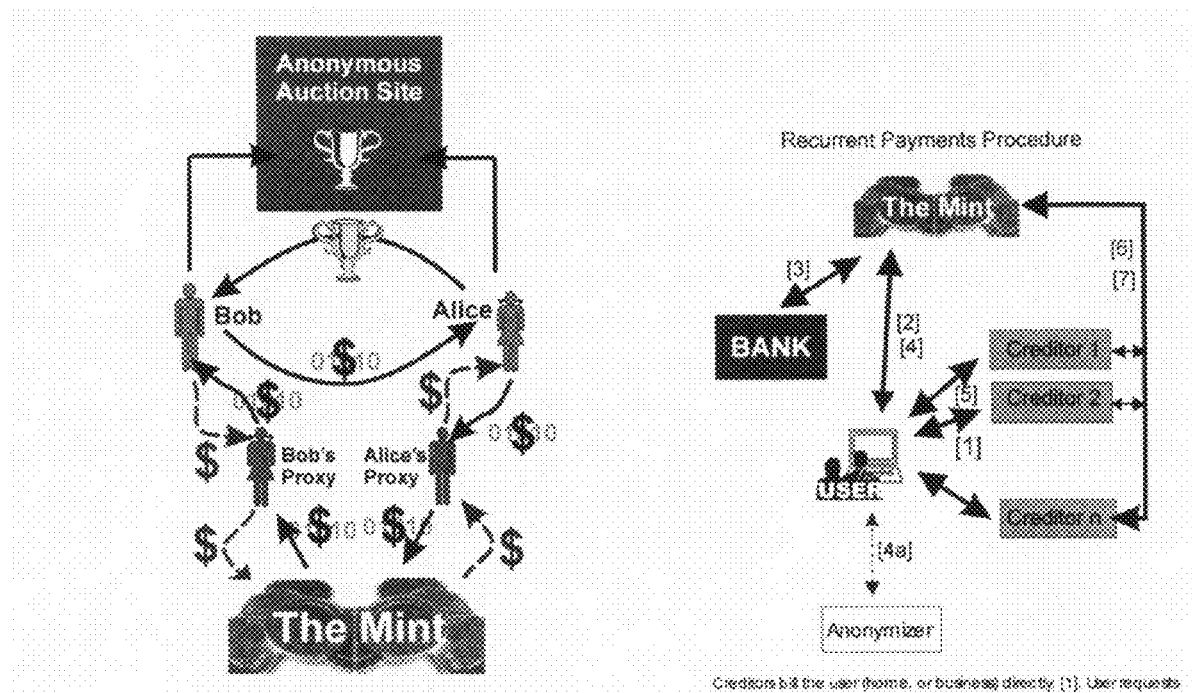

Fig.-13

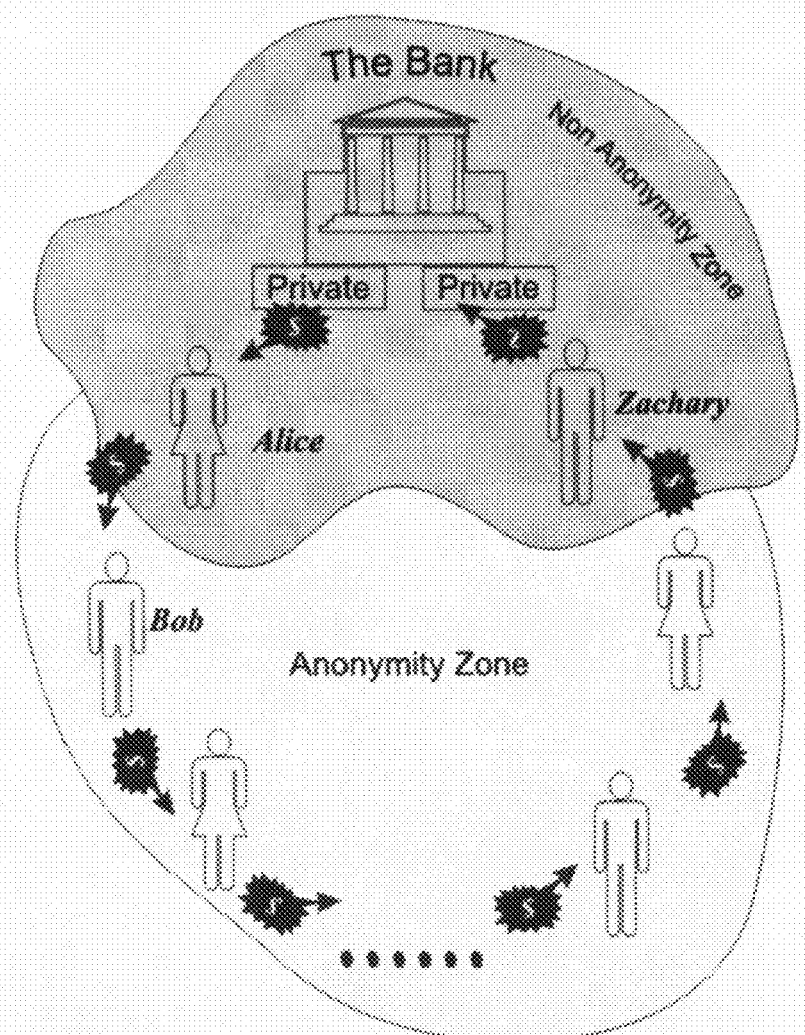

Alice creates a password controlled account with her bank. When she wishes to pay Bob she passes to him the password. Bob confirms the content of the account, changes the password, and passes the new password to Carla to whom he wishes to make a payment. Carla does the same vis-a-vis David, and so on, any number of times, until Zachary, the last payee decides to transfer the traded account to his personal account.

Only Zachary and Alice are known to the bank. All the others are completely anonymous towards the bank and towards each other.

BIT CURRENCY: TRANSACTIONAL TRUST TOOLS

CROSS-REFERENCE TO RELATED APPLICATIONS

This application claims as priority date provisional application filed by the same inventor: Application No. 60/907,869; filed on Apr. 19, 2007, entitled: "Innovation Package G7419". It also claims as priority, data provisional application filed by the same inventor: Application No. 60/960,672 filed on Oct. 9, 2007, entitled "Innovation Package g7o09". It also claims as reference the pending U.S. patent Utility application Ser. No. 11/357,940 entitled "TradeChess: a Game-Formatted Trading Environment". It also claims as reference U.S. patent Utility application Ser. No. 10/115,961 entitled: "Small Size High Volume Random Bits Container" filed on Apr. 5, 2002. It also claims as reference U.S. Pat. No. 6,823,068 granted to this inventor, and also claims as reference the November 2007 publication by this inventor, entitled: "Proposing a Master One-Way Function" posted at: http://eprint.iacr.org/2007/412.

BRIEF SUMMARY OF THE INVENTION

The abstraction of transactional value has moved from gold, to paper, and now to bit sequences. This invention defines a set of tools and procedures to enable bit-currency as the Internet-era expression of transactional value. Its main premises are: (1) string value is expressed through string length, not through its bits identities, which are used to distinguish between coins and to enable easy, independent coin splitting, and delegated asynchronous payment authentication; (2) instant payment between online strangers, (3) secure as desired access to online bank accounts, (4) Peer-to-Peer (P2P) network enabler, (5) Transaction related services: proof of delivery, cash on delivery, etc. These bit-currency transactional trust tools ($T^3$) are based on digital coins, comprised of a header containing meta information, and a body containing a random-looking bit sequence, the length of which is proportional to its value. Thereby a coin can be split by creating two coins each with a value proportioned bit count. The bit size of the coin will be large enough to enable its use through a hierarchy of authentication where lower nodes in the authentication hierarchy have sufficient information to tentatively authenticate a coin, but not sufficient information to defraud the higher up node. This will allow instant transactions and asynchronous authentication. Two strangers will exchange bit currency through a procedure that creates temporary privacy, which is sufficient for the transaction to take place. The redemption of a digital coin is easily subjected to certain rules. Such rules might enhance give-and-take participation within Peer-to-Peer, (P2P), networks, and also facilitate transactions of digital goods subject to proof of delivery, cash-on-delivery, etc. The header portion of each digital coin will contain information regarding use, security, conditions of validity, and suchlike. A strong as desired authentication procedure will offer secure access to one's bank account.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable

BACKGROUND OF THE INVENTION

The Internet became the modern day "town square"; it's where people "walk", shop, inspect, interact, deal, display and inevitably: transact: exchange trusted form of value. Today the vast majority of financial or value transactions rely on the platform of the various credit card companies, which have adapted their methods from the pre-Internet era. The popular credit card paradigm while omnipresent is also fraught with inconveniences, and risks. Credit card transactions involve exposure of the credit card data, which includes the card data, and any personal data used to verify the identity of the card presenter. All that data as it moves across the Internet's arteries, is subject to theft, and abuse. And thus by buying a $10.00 item on the Web, a credit card owner may risk his full credit line, should his card particulars be pilfered by a cyber-thief. Merchants in need of instant verification, keep their customers' data "close to the surface" where hackers can and do access them. Credit card purchase is traceable, and allows the credit card companies, and any government agency so empowered to build behavior profiles for the millions of credit card users, simply tracking what each user is buying. Credit card transactions are ill disposed toward micro payments, which may be quite popular on the Web. Also, the modern Internet dynamics features software applets which are in need of micro transactions carried out through pre-established rules, and without human intervention—hard to carry out with credit cards. When people access their credit card accounts, or their bank accounts, they are burdened with tedious and annoying identity-verification dialogues, which can be spoofed, and allow hackers to masquerade as their victims. These assorted difficulties and others have created the pressure to develop alternative ways to transact currency online. Merchants and sellers, as well as buyers are becoming quite creative financially, and they invent alternative currencies comprised of loyalty points, and other conditional payment instruments to guide and cajole the market to their interests. Years ago, initiatives, like DigiCash have attempted to mint digital coins for anonymous use on the Net. The initiative failed for coming on too early. Today there are various alternative-currency companies, and various payment platforms, which are generally an off-shoot of the prevailing credit card platform. Against this background the present invention comes forth.

DETAILED DESCRIPTION OF THE INVENTION

This invention is comprised of a set of complementary procedures (tools) to enable efficient and convenient transaction of value online. Value is abstracted in the form of money, which depends on mutual trust. Even gold, the early form of money, was not in and by itself a useful commodity: you could not eat it, not plant it, not build with it, nor haul with it; people accumulated gold only because they expected others to be willing to give something of practical value in exchange of it. By contrast, in a barter regimen, one peasant surrendered, say, three useful guard dogs, for one useful horse.

When gold was exchanged for paper, the dependence on mutual trust grew even bigger, and the same for the current stage when money is about to assume the form of a bit string. Per se, a bit string is useless, and its only value is trust-dependent. And hence to run a transactional regimen online it is necessary to provide the trust, which for the first stage (where we are in), that trust will be provided by secure tie-in of the bit string to US dollars, or any other established national currency. Traders would pay dollars, receive a bit string, trade the bit string in their normal course of activity, then redeem any bit string in their possession against US dollars or other established currency. That is the bird's view of the emerging era of Internet transactions. We can therefore define the concept of a digital coin, of any desired denomination, and which is comprised of meta data describing various parameters thereof, and also describes its payload, or 'body,' or contents—the string that would identify the value of the coin.

The first part of this invention relates to how the value of this coin is being expressed. In the nominal way the bit string expresses its value through the identity of the bit sequence. E.g. bit sequence: "1000", means decimal 8, "1010" means decimal 10. Any other combination of bits in a four bit sequence will mean a different value. In this invention we part with this method, and rather use the size of the string, its bit count, as the expression of value. Thus if 1 US cent corresponds to 10 bits, then a US dollar will be expressed via a string of a 1000 bits. Any 1000 bits long coin will be associated with the value of $1.00, regardless of the identity of the bits. This implies that one could mint $2^{1000}$ coins of $1.00 denomination. By so expressing value it is possible to mint a sufficiently large number of coins to be traded individually and distinctly much as paper dollars are. The identity of the coin will be expressed through the identity of its bits—as opposed to the value of the coin which is expressed by its size.

A given "mint" will thus be able to mint (issue) coins of varying denominations, and hand them over to online or off-line users who would buy such coins by paying the corresponding value in US dollars, or any other acceptable currency. Any trader who so purchased a digital coin would be able to transfer that sequence as a method of payment for any transaction he or she could make. Here we reach the point of trust. The payee will need to verify that the sequence of bits he is getting (the digital coin) is in fact redeemable. That is, he or she could approach the mint with that sequence, and receive the corresponding amount in US dollars. After all the payer could have minted his own coin, and falsely proclaim that it was minted by the mint. The way for the payee to verify the authenticity of the coin just paid is by contacting the mint and getting their assurance that the coin is valid, and that the user could redeem it anytime he wishes to. Here we come at the second element of this invention. A trader verifying a coin could demand from the mint to exchange the verified coin with a new one (same value, different bit identity). The mint will then invalidate the verified sequence, so that if anyone checks on it, it would come back as 'invalid', (hence the payer cannot reuse the same coin again), and the verifier will get a brand new sequence for him to use. It's important to note that the mint (also referred to as 'the bank') would not have to verify the identity of the coin verifier. It would work like cash, the coin itself is verified, but its holder may remain anonymous.

This very act of coin verification is the bottle neck of online transactions, because the transaction cannot conclude before the payee is assured that he was paid with a valuable coin. This invention includes a mechanism to alleviate this burden of instant verification.

Here is how it works: The reason that instant coin verification is a bottleneck operation is that all verifications must be handled via a single source. If, for example, two computer centers, that is, two authentication sources, will share the verification burden, then a wily user will be able to use each coin twice, once verified by one source, and the second time verified by the second source. With a single source, there is one database that identifies all outstanding coins, and each time a coin is being redeemed or exchanged, it is flagged as such, so that when queried again, it would be responded to as 'invalid'. We refer to this database as the master coin database. This invention alleviates this single source burden by creating a verification or authentication hierarchy. The original single source (call it also the ultimate source of coin verification) will project into 2, or say n first level sub-sources. Each sub-source will receive a partial cut from the master coin database. The cut can be two ways. One: coin count. Every sub-source will receive some of the coins to construct its sub-database with. The other way is by divulging to the sub-source only some of the bit identities of each coin. So, if a 100$ coin is comprised of 100,000 bits, then the sub-source might be given the identity of say every other bit. So the sub-source will know 50,000 bits out of the 100,000. It is important to spread the known bits evenly across the coin, because it may be split off, and then for some coin section submitted for verification, the sub-source verifier will have no knowledge what so ever This arrangement will enable users to access any one of the n sub-sources for the purpose of coin verification, (instead of clamoring all onto the single source). When a trader approaches a sub-source for verification, then the following happens: the queried coin may not be included in the sub-source's database. In that case the sub-source will contact the single source, and pass the query request to it. Of course that will mean a greater communication burden as opposed to the trader directly querying the master source. It is therefore incumbent upon the designer of the system to minimize such occurrences. That is to say that a trader should be likely to query a coin with a sub-source that includes that coin in its database. An element of this invention relates to how to insure that likelihood. If, on the other hand, the queried coin is listed in the sub-source database, then the sub-source could tentatively OK the coin as valid based on its knowledge of the identity of 50% of the bits (too many bits for chance matching). The sub-source will then send off that verification fact, along with the presented coin up the hierarchy to the ultimate source. The ultimate source will then examine the full bit image of the coin against its master database, and confirm the verification of the sub-source if all is well. Since the sub-source only knows the identity of say, 50,000 bits, and not all the 100,000 bits of the coin, it would be impossible for the sub-source to defraud the single source. Only a holder of that coin has the identity of all its bits. If we further insure that each coin will appear in the database of only one sub-source, and no more, then, it would be impossible for a trader to defraud the system. If a trader approaches a sub-source where the coin is not listed, his verification request will go to the single source, who would first notify the sub-source that lists this coin that it's no longer valid, and only then verify it to the trader. This will make the trader wait for a while for his verification. However if one manages to build a system whereby the majority of coin verifications happens between a trader and the sub-source that lists this coin then the burden of real time verification by the single sources is alleviated via n sub-source verification. (n+1) verification sources really because a trader could still approach the single source for verification, and the single source, in that case would notify the sub-source that lists this coin.

Each sub-source, in turn would be able to delegate its own verification authority further. Each of the new sub-sub-sources will be given the identity of only 25,000 bits of each 100$ coin, and the coins will be divided among the m sub-sub-sources under each sub-source. This could continue for as many layers of sub sourcing as desired. The number of known bits will be progressively smaller for each lower level of sub sourcing, but the number will still be large enough to prevent chance guessing.

This authentication of verification hierarchy could be designed to maximize the 'hits'—the number of times that a trader approaches the right sub-source for coin verification. So for example on entering a shopping center, a trader will exchange his $200 digital coin with one that is listed in the shopping center sub node. The exchange will be done through the shopping center sub node that would take the incoming coin up the hierarchy ladder until it finds the level where it can be verified. The verification notice travels down the hierarchy ladder to OK the incoming coin to the shopping center sub-source. The shopping center sub-source will then issue a coin of its own database (that is marked as unused, unclaimed, not yet in circulation) to the entering trader. Simultaneously the shopping center sub-source will send up the ladder the fact that his unused coin has been circulated. The trader then will have a $200 digital coin that he could redeem in any store in the shopping center, getting instant approval from the shopping center sub-source. Hence all the shopping done in that mall, could go ahead instantly even if the central financial computer (the ultimate source) is shutting down, or is too congested at the moment.

This procedure enables asynchronic verification, because any sub-source OKs a coin based only on knowledge of part of its bits. The Ok travels up to the single source ultimate verification at some later point in time. Should there be any mishaps, and the unknown bits don't match the single source listing, then the mint which takes its cut from every minted coin will take the loss for it. Since one could change the number of bits known to each level, it is possible to manage this off chance.

The size-based value of coins which enables this delegation of coin verification is also the foundation of the splitting option for each coin. A hundred dollar coin, comprised of 100,000 bits could be split into two $50 coins, each comprising half of the sequence, namely 50,000 sequential bits. The split can be at any ratio up to the smallest tradable denomination, say, for instance $1.00. A trader will be able to handle one large coin, say for $1000, and chop out of it strings corresponding to the amount to be paid. The data of the original coin that spawned this sub-coin will be carried in the split-off coins' headers as meta tags.

If the trader and the mint know each other then they could use symmetric cryptography to safely exchange coin information. If they don't know each other they can rely on asymmetric cryptography for that task. If, however a coin needs to be dispatched between two strangers, which are individuals without a published public key and a corresponding private key, then the coin could be exchanged through the procedure of PINprivate, explained here forth:

Alice and Bob are two perfect strangers, wishing to trade online. They may use the PINprivate procedure, defined as follows: Alice prepares a list of n cryptographic keys, and posts them on the web. She also prepares, and communicates to Bob n computational tasks that are expected to last t seconds each to compute (on Bob's standard computer). Bob chooses one of the n tasks, and computes it. He sends the result back to Alice. Alice who prepared the computational tasks ahead of time, also computed ahead of time, the results of those n tasks. When Bob sends her back the answer to the tasks he chose randomly, Alice checks it against her list of n results, and finds out which of the tasks, Bob chose to compute. That choice, i, then points both Alice and Bob to the cryptographic key key(i) from the key list mentioned above. That key becomes a temporary shared secret between Alice and Bob. Harry, the hacker will find the value of i with some delay. He would simply go through the n computational tasks, and eventually find out which tasks corresponds to the result that Bob sent back to Alice. The key to this procedure is the time delay between the moment that Alice and Bob share the value of key(i), and the time that Harry, the hacker, catches up with them. Since Alice controls both the difficulty of computing each tasks, and the number, n, of tasks for Bob to choose from, Alice can insure that even if Bob has a much faster (but fairly estimated) computer, the time delay for him to catch up will be sufficient to insure the required temporary security between Alice and Bob. While the notion of creating secrecy through choice of tasks was published before, the application of this concept to temporary shared secret is claimed as novel.

Alice will use the short time she enjoys with Bob of being the only two parties to the value of key(i), by using key(i) to encrypt the address of a record which is part of the PINprivate database. That record may contain a digital coin that Alice has placed there for the purpose. Bob deciphers Alice's encrypted record address, and accesses this record, copies its coin (contents), and verifies the value of the coin through the verification hierarchy, and right afterwards erases the contents of that record from the PINprivate database. Once verified the transaction is concluded. Harry, the hacker, might work his way by computing all the tasks presented by Alice, and after some delay he will find out the value of key(i), decipher Alice message with it, and find the same record, only that it would not contain the coin anymore.

This is the basic idea. It may modified and enhanced in several ways. One important way is for the PINprivate database management to track successive access attempts for a given record. If two or more online users are trying to pry open the same coin address, it is a sure sign that hackers are on the prowl for that coin. It would be a matter of policy what to do in that case. One solution would be to freeze everything, notify Alice that hackers have been active here, and by the measure of time between inquiries, Alice would know whether or not the engineered and expected delay is big enough.

Another modification is for the PINprivate database to include not a coin identity but a secondary cryptographic key, which too will be erased once copied. This secondary key cannot be hacked down by the hacker, and can serve as a durable shared secret between Alice and Bob, and thus used to encrypt the coin Alice is sending Bob, as well as for any other private communication between them two. There is a simple way to device computational tasks with credibly expected computing time. This can be done by making them brute-force cryptanalysis tasks, (using one-way functions) in which the computation necessarily involves trying every number in a given range until finding out which number computes back to a given number. It may be any sequence, not just a number. Basically given a well designed size ciphertext, the brute for approach would be to try all possible keys that lead from a known plaintext to that ciphertext. The mentioned PINprivate database is a large database posted by Alice or a third party. It is comprised of records containing: record-identifier, passcode, and contents. They are accessible to any online party who may ask for a particular record by its identifier, then forward its passcode, to prove reading privileges, and if the forwarded passcode matches then the approaching party gets control of the record, can read its contents, and permanently erase it. This, so called PINprivate database may be posted by Alice as part of this exchange, but it can also be posted by an unrelated party providing this database service. In this latter case, the database provider will have to be trusted, since it will have visibility over the contents of the record. This notion might be the key for some government intervention in case of investigating a crime.

On the opposite end we have Alice trying to get access to her bank account where she holds all her liquid assets. It is important to insure that only Alice and no hacker would be in a position to access that account. This can be done by delivering a PIN from the bank to Alice, using some off-line, secure means. Alice will then use the PIN to access her account but would never type in the PIN or communicate it to the bank. She will only use a derived piece of data that would not point to Alice's PIN. This can be accomplished using the master one-way function that will control how intractable it is to deduce the PIN from the captured traffic between Alice and the bank. The novelty here is in the combination of a never-typed PIN, and a controlled reverse computing difficulty. This procedure is referred to as PIN-Plan.

The easy split feature of this digital coin offers easy, quick and automated transactions between 'agents' rather than human beings. Case in point: a peer-to-peer (P2P) network, where nodes both give (resources, computation, storage), and take benefits (communication of data to a destination). The success of a P2P network depends on the fair participation of most of the nodes. Otherwise nodes will be switched on when they need the service of the network, and switch off when they are expected to contribute their services to the same. To combat this tendency, a size-measured, easy-split digital coin will be most appropriate. An originating node will attach a digital coin (size measured bit sequence) to a message to be P2P transformed. Each node that will supply resource services in the pathway of the message will be paid from the attached coin, according to some payment schedule. Hence a passing message will incur payment from the originator of the journey to all those nodes that supply services to it. This allows for efficiency driven modification of routes. High capacity nodes might exact a higher price for their service. Such a paradigm of quick coin splitting will take place without constant and per-transaction verification of the coin. It would hardly be necessary because the nodes are there for the duration, and they need the network to function. And hence if some times later it appears that a particular node has cheated with fraudulent coins, that node will be cut out of the network. This would deter most node operators from coin cheating. Also, the sums per transaction, or per millisecond, are very low, and since a fraud will be discovered soon enough, it does not pay to rob the software house which is supplying this P2P digital coin network. Governing rules will chop off the carried-on size-measured digital coin, and pay the servicing nodes according to preset rules of payment. Some provisions will be put in place what to do if the original coin is exhausted and the message is not yet fully delivered. Similar rules will identify how to split a coin if the message is split. Generally the original coin will be set high enough to support even a long and arduous communications path (many service nodes), with the balance transmitted back to the original node using, say, the central, network, "bank," which serve as a coin management and mint center. Nodes that over used the system without being switched on sufficient time to collect credit will have either to purchase network money against a hard currency, like US$, or switch themselves on, compete on giving services (thereby making money) to be used for their own needs. The whole operation can be primed with a standard number of coins given to each node. The subsequent transactions will redistribute these bit currencies among the nodes. This network bit money will be either on a stand alone basis, where there is no transfer of debit or credit from anywhere, or linked to another platform for automated payment, or perhaps tied in to US$, so that owners will be able to buy Internet money, and use it in a bidding game to get favorable advantages over high capacity nodes. As mentioned, the split-off of coins is straight forward, because the coin bit count expresses its value.

Transacting digital goods is a special case for bit currency. By using the currency as an encryption key, the buyer will submit the coin header (from a coin in his or her possession) to the seller. The seller will send the header along with the goods to be sold to the Mint (that issues these coins) to be encrypted. The digital goods are thus encrypted with the contents of the coin, the buyer claims to possess. This would happen after the mint verifies that the coin is valid (not fabricated, and not already used). The Mint will send back the encrypted goods to the seller, and he, or the Mint directly, will send the encrypted file to the buyer. The buyer will use the contents of his coin as a key to decrypt the goods and enjoy its value. By using the encryption method defined in U.S. Pat. No. 6,823,068, issued to this inventor, it is possible to use any size key to encrypt and decrypt the digitized goods.

The notion of encrypting digitized goods will be readily applicable for instances where an intermediary is managing a file transfer regimen. Companies, like Pando Inc. offer users to send large files from one to the other. The files are controlled, and managed, by the Pando servers. This man-in-the-middle transfer may be used as follows: The sender sends the file to the receiver using a file intermediary like Pando. The intermediary encrypts the sender's file before releasing it to the recipient. The recipient sends the intermediary the received file hash value (its digital signature). Once the signature is verified by the intermediary, it checks for certain delivery conditions, and if fulfilled, the intermediary sends to the receiver the decryption key to decrypt the file in his possession. (All that is managed by software). The intermediary then sends the sender a certificate of receipt of the file. The receipt is based on the examination of the hash value, proving that the encrypted file was received all right. The conditions for the intermediary to send the decryption key to the receiver may vary. They may be a verification that the payment for the goods was made. The intermediary could serve as a mint, or rely on the services of an external mint. Once the receiver sends the coin to the intermediary, to pay for the digital goods, the intermediary verifies that the coin is good, cut from it, its own service fee, and send the balance to the benefit of the sender. Normally a sender will have an account with the intermediary, and the payment from the receiver will be channeled into that account. Other conditions may involve some declaration on the part of the receiver for proper use, for not transferring further (respecting digital rights) etc. This procedure offers the sender a silent proof of receipt. This might be significant in some business climates. The conditions for the transaction could work either way. The recipient too could withhold his sending of the hash value until the sender makes certain warranties, like the fact that the file is owned by the sender or is public domain, or that the file does not contain private information, lewd material, etc.

Bit currency can be used in the framework of P2P mass distribution of new music and other digitized goods. Today the P2P technology is used to rob artists and right holders of their digital rights, but with bit currency it would be possible to harness this technology to pay the rights holder. The procedure is as follows: The basic framework is the same as was used by Kazaa, namely that any computer that acquires a copy of the song, video or any other digitized goods will make its copy available for others to copy from. This way a single copy, once copied has two sources to copy from, it becomes four copies, eight copies, and very quickly the entire net-vista is filled with copies of that song or digital goods. The bit-currency procedure will put forth software where owners of a copy of that song will set up a price for which they are ready to sell it further. Prospective buyers of this song will scout the various sellers to decide where to buy the song. Naturally they would opt for the cheapest offer because all copies are exactly the same bit wise. However, the cheapest source may have a queue comprised of many others that flocked into the same cheap source. This will mean a long waiting time for the next user. That user may then opt to purchase the song from the next cheapest source, and if that one is congested, to upgrade further to more and more expensive ones, until the user finds the source best suited for him. This will properly compensate any sources with T1 or T3 fast cables. The buying node will have to transfer to the selling node the bit currency to pay for the song. The seller will take all the accumulated pay-off coins and attempt to redeem them with the respective mint. The mint will translate the bit value to dollar values but will effect (1) a service cut for itself, and (2) secure a cut to be paid to the rights owner. The balance will be forwarded to the seller of the digitized goods. This arrangement will make the seller an agent for the rights holder, who is paid by the rights holder for distribution of the goods. The more the seller makes, the more the rights-holder makes. It is important to note that all these payments are negotiated by software, without human intervention.

Bit currency does not have to be dollar hinged. It may be comprised of loyalty points, gift points, etc.

For further details and specific elaboration please refer to the appropriate provisional filings referenced herein, or to their extracts henceforth:

Random Bits Currency

Elaboration

The underlying concept: Currency—value—is embodied in a series of random bits. The length of the series expresses its rated value; the identity of the bits [0,1] facilitates secure and convenient transactions and safekeeping.

This bit expressed currency may offer a fixed link to dollars or other established currencies, or a conditional link thereto, or alternatively be totally unlinked to any other currency. Accordingly, the random bit currency will be usable for electronic payment of traditional currencies, for promotion of alternative currencies—like reward points, and bonus coupons, and for novel enhancement of certain worthy objectives, like community charity.

The security of the random bit currency is vested in the unpredictability of random bits, which means it is not susceptible to the inherent weakness of cryptography based digital cash—the specter of a mathematical shortcut that undermines the employed ciphersystem. This robust security insures the viability of random bits currency even when used to store, and transact very large sums of money.

The random bit currency concept, and its proposed implementation will be described in the following chapters:—the concept—implementation avenues—business model—physical coins—security analysis

1. THE CONCEPT

"Parting with the common way of using bits to represent value, and retreating to the primitive notion of counting." This is the underlying concept of this proposal. "Using the dual identity option of bits [0,1] to mark a string of bits with a unique string identity" is the enabling principle of this concept. By vesting the value in the count of the bits, their identity is left free for any purpose other than determining value. The two main purposes associated with currency—other than its value—are: ? convenience ? security Bits are the most abstract in this range of value carrying entities. They are intangible, lend themselves to electronic transport, to copying, to storage, and to instant display. So they have the potential for utmost convenience, given the proper protocols. Albeit, the more convenient a currency, the less secure it is. It is easier to forge a dollar bill, than to forge a chunk of Gold. It is more tempting to commit fraud on bits, than on a physical paper bill. So security is the key to the wide spread usage of random bits currency (RBC). Security is achieved through the protocol of image retention. The nature of the attained security is discussed below. A challenge to this bit-count model may come from a proposition to create digital coins as a tuple between a standard size binary sequence (say 100 binary digits to offer substantial security), and a regular indication of value. The tuples will look as follows: value: security string:

| value:  | security string: |
|---------|------------------|
| $10.00  | 100110010010001  |
| $10.00  | 101100011110110  |
| $20.00  | 010101001110100  |
| $50.00  | 000011111010101  |

This setup appears more economic as data storage and communication are concerned. The answer to this challenge is in the following arguments:

1. The proposed tuple offers the same security for $10, as for $10000. The bit count model offers higher security for higher denominations.

2. The proposed tuple does not allow coin splitting. The bit-count model allows ready splitting to any smaller denomination, without requiring the Mint to carry out the split. So the bit-count model allows for purchase of large denominations that are subsequently spent in small transactions.

3. Use of the approval tree. As seen ahead redemption can be done by an agency that has knowledge only of a fraction of the coin bits. The smaller the fraction that still offers security, the deeper the approval tree may be. The approval tree is critical in alleviating the burden of coin redemption.

4. Encryption security. If the tuple is encrypted with a small symmetric key (zero entropy), then a cryptanalyst will be able to try several keys until he finds the hidden tuple. Albeit, if the random bit string is encrypted then every tried key produces a plausible coin, and there is no way to disqualify a given key. This elevates regular, zero entropy encryption into equivocation-level security.

1.1.1. Terms and Elements

The key terms are:
digital coin
mint
traders
physical coins, readers and writers

1.1.1.1. Digital Coins

A sequence of v bits is defined as a digital coin of value v. Each coin is associated with a coin identifier, Cid, and some attributes. The only part of the coin that is to be kept secret is the coin image—the identity of the coin bits. We further discuss:—the coin bits—the coin identifier—the coin attributes

1.1.1.1.1. The Coin Bits

The bit count is the carrier of value. The identity of the bits (one or zero) serves for security purposes. The identities of the coin bits can be assigned in a random fashion. This randomness is important since it renders the encryption of that sequence into an effective equivocation based encryption even when used with the customary zero-entropy systems like DES, or RSA.

1.1.1.1.2. The Coin Identifier

The coin identifier is a unique string that is tied to a particular bit sequence of a coin. This connection is crucial in coin administration. Security is based on the inability of a non-coin holder to anticipate the connection between a coin identifier and a coin bit content. It would not be sufficient to guess a valid coin sequence, one would have to link such a sequence to the right coin-id. The coin-id itself may be selected according to some secret rule, so that a would be cheater who does not know the rule will be turned down without even checking the value bits. The coin id can also encrypt some coin attributes. However, the main reason for the coin-id, is the design of the approval tree. As seen ahead, we envision a situation where an approval agency will have knowledge of only a small portion of the value bits, and in that case the coin-id will be the only way to uniquely identify the coin for the case of communicating the coin among approval agencies.

1.1.1.1.3. Coin Attributes:

The nominal coin attributes are:—Mint-id—Date Minted—Date of Expiration—Ownership id—Value Equivalent/Bit Value—Type (class)

The coin attributes may be in the clear and/or encrypted to retard unauthorized alterations. The encryption may be carried out via a private Mint key, so that it can be readily verified by trader's using the Mint's public key.

1.1.1.1.3.1. Mint ID:

Since the market may be filled with digital products from various sources, it is necessary to identify the Mint that issued the coin, and which stands behind it, ready to redeem it.

1.1.1.1.3.2. Date Minted:

The date a coin is minted has important security implications. Evidently any transaction that took place before the mint date could not possibly have involved that coin. The mint date will be the opening date in any attempt to track down the audit trail of that coin.

1.1.1.1.3.3. Date of Expiration:

Some coins may last indefinitely, others may come with a date of expiration. Usually when the value represented by the bits is cash equivalent, and the coin was redeemed against hard currency, then, by law in many jurisdictions, the coin can never expire. Albeit, if the coin is given as a present, or its bits represent a non-dollar value, then expiration is a practical possibility.

1.1.1.1.3.4. Ownership ID:

Some coin owners may wish to guard their value against theft or robbery. This can be done via ownership attributes, carried in an encrypted fashion on the coin itself. The other possibility is to store the ownership id on the Mint's database. The advantage of coin stored id is the ability of some other approval and verifying agent to check the id, without having to hold the Mint's database. Different coins, with different risk factors would have different encryption keys for their ownership id. Ownership id options are:—PIN: Personal Identification Number—Personal Biometric Data

1.1.1.1.3.4.1. PIN:

The options for PIN are:
1. anonymity preserving owner selected PIN id.
2. anonymity preserving mint selected PIN id.
3. non-anonymous Verifiable personal id

1.1.1.1.3.4.1.1. ANONYMITY PRESERVING OWNER SELECTED PIN ID

This option is exercised when a coin holder contacts the Mint, and provides some sequence of letters and digits that he requests should be keyed in for every attempt to redeem that coin. The Mint will replace the submitted coin with a freshly minted one where the coin id includes the user supplied PIN id, encrypted of course. This would give the coin owner the security that if the coin is lost or stolen, it would be redeemable. Alas, if the owner forgets his user id, he or she can not lay claim to its value. Since the owner maintains his anonymity, there is no way for the Mint to know that a claimant who forgot the PIN is the true owner. Such PIN id is likely to be used for high value coins.

1.1.1.1.3.4.1.2. Anonymity Preserving Mint Selected Pin ID

When the Mint selects the PIN, it may be guaranteed not to duplicate any existing id. By contrast a user selected PIN id might double that of another user (a security weakness). The Mint selected PIN id will be well constructed to foil guessing attempts. But most pointedly perhaps, the Mint selected PIN id can be constructed to carry meta data, on place and time when the coin was circulated, some level of suspicion etc.

1.1.1.1.3.4.1.3. Non-Anonymous Verifiable Personal Pin ID

A coin holder may provide an anchor id which will be tied to his or her actual identity. Such id may be an official issue or biometric identifier. Official issue id may be a credit card number, a bank account, an organizational membership id, like a serial military number, a driving license, or some other license number etc. A biometric identifier may be finger print, palm print, retinal data, DNA, etc.

1.1.1.1.3.5. Value Equivalent/Bit Value

The coin will identify what the coin bits stand for. It may be some national currency, like dollars, or some loyalty "points", or any other measure of value. The coin will also identify the bit equivalent for the value currency. If the bits represent dollars, then the bit value may be 1 bit=1 cent, to allow for a high resolution payment option, or it may be 1 bit=1 $, or any other mapping.

1.1.1.1.3.6. Type (Class) of Coin

The Mint might issue several classes of coins. First there are the regular coins that cater to full anonymity. The coin holder may redeem the coin value without divulging his or her identity.

A second class is the alpha-coin, which offers prospective anonymity, not guaranteed anonymity. Alpha coin traders will have to agree to the alpha terms which generally imply that a trader might be required to divulge who paid him with this coin. A third class is a beta coin—a coin which earns interest to its bearer. A fourth class is a gamma coin—where the value is linked to a fluctuating financial instrument, like a stock. A coin can be alpha-beta, or alpha-gamma, but can not be beta-gamma.

# 1.1.1.1.3.6.1. Alpha Coins

Alpha coins are minted to enable alpha trade. This is a distinct trade option in which the inherent anonymity-prone scheme for regular coins is replaced with a theft-resistant mode where anonymity is not guaranteed but rather prospective. A regular coin can be redeemed with the Mint by its anonymous holder. If that holder is a thief, there is no recourse to the theft victim. Thus regular coins are not too safe for storage in one's computer. Because they can be hacked there, and redeemed, while the rightful owner is under the impression that he has ready value in his file. Only to be disappointed when he eventually attempts to redeem those coins, and receives a response: "sorry, this coin was already redeemed". Regular coins are good for situations where the bits are concealed, physically or cryptographically. By contrast alpha coins are traded under different terms. Every trader agrees to divulge the party that paid him or her that coin. If he or she can not identify the payer, he or she is considered a non-rightful owner of that coin. The trade is designed in a way that only a small fraction of the alpha transactions will be challenged by such an audit trail. The vast majority thereof would remain anonymous. That is why the alpha anonymity is considered prospective anonymity. Alpha coins are circulated eponymously. The circulator must identify himself to the Mint. They may also be redeemed eponymously. The redeemer will identify himself, or herself to the Mint. Albeit, there is an option for the redeemer not to identify himself, but to agree for the redemption money to be held in escrow for a set period that would allow some challenger to challenge the redemption. In normal trade these two traders (the circulator, and the redeemer) are the only ones that are exposed. All the interim traders, the passers who passed the coin from one trader to another—remain anonymous as far as the Mint, or any authority is concerned. Alas, if the redeemed coin is challenged by someone else who says that he or she is the rightful owner of the coin, and claims that the redeemer is a thief or has the coin by mistake, then the Mint will initiate an investigation. The investigation will attempt to chart an audit trail from the redeemer, and from the challenger back to the circulator. Only one of these two trails will emerge in tact, and that trail will determine whether the redeemer or the challenger is acknowledged as the rightful owner of the coin. The Mint will have the ability to reverse the coin redemption if it turns out that the redeemer is not bona fide. This audit trail conflict resolution scheme is deemed so powerful, and so capable of implicating thieves, that most of the would be thieves will not even try to steal an alpha coin. And hence, only a handful of coin redemptions will be disputed. Which means that for the most part the passer traders of the alpha coin will remain anonymous. Not a guaranteed anonymity, but a prospective one. Prospective anonymity does resolve the fear of "big brother". Most people, arguably, don't mind that some big corporation, and by extension, the government, knows of an occasional purchase they made. What gives people the chills is the completeness of knowledge. The fact that the credit card companies know with perfect memory every visit to any restaurant, any flight, each purchase of shoes, or groceries. This completeness of record is well remedied with prospective anonymity as offered by alpha trade.

1.1.1.1.3.6.2. Beta Coins

These are coins that earn interest to their bearer. The interest accumulates from the mint date to the redemption date. Since the Mint earns interest on the prepaid sums of the coin, the Mint might share this earning with the trader (and earn the spread). The trader will then be incentivized to hold on to the coin without redemption to accumulate the interest. This would allow traders to earn interest anonymously, which they can not do with a nominal bank. Beta coins are further specified with their associated interest rate.

1.1.1.1.3.6.3. Gamma Coins

Gamma coins are linked to a fluctuating value of a financial instrument, like a stock. When they are redeemed the redemption value is computed based on the change of the value of the instrument between minting time and redemption time. A gamma trader might win or lose depending on the financial fortunes of the underlying instrument. Gamma coins are further specified with the identity of the linked instrument.

1.1.1.1.4. Coin Refreshment

A trader may opt to refresh a coin. In that act the held coin will be replaced with another coin of corresponding value. This refreshment act may be used to foil thieves, to change status, to cash interest, or to sell "stocks". A beta coin holder will refresh the coin before making payment with it. The interest he earned will be reflected in additional bits on the refreshed coin. A gamma coin holder will redeem the current value of the linked fluctuating instrument. For both cases the refreshed coin may or may not be a beta or a gamma type. So refreshment is a way to changing coin class (type). Also coin refreshment can be used to activate or deactivate a PIN security setup.

1.1.1.2. Mint

The Mint is a source, an authority, that issues digital coins, and subsequently redeems them. The Mint builds the system of random bits currency, runs and operates it, and it sustains itself by earning the trust of its traders. The Mint can be a government organ, or, preferably, a commercial entity. The Mint keeps a database of all coins issued. The database lists the coin image in association with the coin identifier, coin attributes, and optionally more data. The key challenge for the Mint is the trust of its traders.

1.1.1.2.1. Traders' Trust: Mint's Lifeline

A digital coin is an IOU statement. For someone to accept it, there must be some measure of trust that the statement would be honored. If that trust is solid, then the IOU can be passed around among a community of traders, and rarely, if ever, submitted to the issuer (the Mint) for redemption. When a new entity assumes the role of a Mint, it is likely to face a great deal of apprehension. It might roll out small denominations, and start a trade. If it honors its obligation trust is being built, and gradually larger and larger coins are traded with this Mint. In a free society people may trade with whatever they like. If digital coins will offer convenience, security, and versatility unmatched by government issued currency, (e.g. dollars), then people will shun dollars and trade with digital coins. So de-facto, the national currency may become moot. Dollars may be relegated to the role that Ft. Knox gold used to have when the gold backed up the greenback. While this is a rather far fetched scenario, it is iterated here to make the point that in a free society a good money and trade solution has a tremendous growth potential.

1.1.1.2.2. The Mint as a Bank

The Mint maintains its integrity by issuing a digital coin against some hard currency. That currency must be kept in a ready mode to pay back when the coin is presented for redemption. This is a property of a bank. The Mint will figure out the rate of liquidly that is warranted, and put the rest into long term securities. In the beginning the Mint will work with a bank. Subsequently, the Mint will turn into a bank. The Mint sells versatility, convenience, anonymity and security to its traders, and for that it can charge. The more attractive its services, the more it can charge for each coin above its nominal value. The Mint, prospectively, will increase the sale reach of merchants, so they too will be justifiably billed by the Mint—per transaction. And thirdly, the Mint will earn interest on the average deposits that are at any given moment circulated among its trusting traders. The Mint will be able to provide incentives for traders to hold on to its digital coins. These incentives, in principle, may be some form of sharing of the interest earned by the Mint for money deposited and not yet redeemed. Much like a bank, the Mint will profit from the spread between the interest it collects, and the interest it offers to depositors. So the Mint might issue interest bearing coins, beta and gamma coins, that would earn their holders some revenue based on a set interest rate or some fluctuating interest rate, as mirrored by tying a digital coin to some financial instrument, like a stock.

1.1.1.3. Traders:

Traders are entities who trade in digital coins. They have faith in it. They are willing to accept coins against some considerations, and are willing to pass these coins along to other traders. Some traders may choose to redeem their digital coin against some other currency. We distinguish three types of traders:—circulators—passers—redeemers

1.1.1.3.1. Circulator

A circulator is a trader who circulates a given coin into the market. He is the first trader to use that coin. He gets the coin directly from the Mint or from a reseller. The circulator may be anonymous or eponymous. He or she may get their coin within a physical device, or electronically.

1.1.1.3.2. Passer

A passer trader receives a digital coin from another trader, and passes it on to a third trader. The passer expresses confidence in the coin when he receives it, and suggests confidence to the receiving trader. The passer is generally unknown to the Mint, and to any other party except the two traders with whom he traded the coin. A coin can be passed along from one passer to another, time and again, like dollar bills. If the coin is "regular" than its passing is very much like cash—without an apparent audit trail. If the coin if of an "alpha" type then, the passers are expected to record who gave them that coin—ready for a potential inquiry.

1.1.1.3.3. Redeemer

The redeemer trader presents the digital coin to the Mint for redemption in a form of a different currency. This event represents the end of the coin's life cycle. The redeemer may remain anonymous, or be eponymous. To remain anonymous the redeemer must request the coin equivalent in cash, usually showing up in person, and unidentified in an exchange station. If the redeemer agrees to become eponymous then he has a range of options from cash, checks, money orders, credit card credit, or bank account credit, or a different e-payment currency. The redemption act may be irreversible, or reversible. Reversible redemption requires eponymous transaction. The redeemer in a reversible redemption may be asked to agree for the reversal if it is subsequently determined that a reversal is warranted. Reversible redemption may take place through a delayed escrow account, where for a set time period the redeemer is prevented from moving the coin's redemption from his escrowed account elsewhere. Transacting with alpha coins requires reversible redemption.

1.1.1.4. Physical Coins, Readers, and Writers

The digital coin may be carried through a physical device. The device will need to fit into a coin reader that would be able to read its id, and image, and send it to the Mint for verification. Also, for low security applications the coin will be designed to input coin data through a coin-writer.

1.1.1.4.1. Physical Coins

Any media that can carry bit marks will qualify as a physical coin. The main distinction is between—write-once coins—re-writable coins

1.1.1.4.1.1. Write-Once Coins

These are devices that are written once, and the data on them can not be changed. Such coins must be traded as a whole. They can not be used to pay a portion of the coin, since there is no way to indicate the remaining unpaid portion. In that respect these coins resemble dollar bills. Once can not cut a dollar bill in half to pay a 50 cents obligation. Write-once coin can be further divided into:—visible-coins—invisible coins—initially invisible coins Visible coins show their bit sequence. Their holder then must be careful in handling the coin to prevent theft. Visible coins are specially consistent with alpha coins which have a built in anti-theft protocol. Example for visible coins are tickets with a bar-code language. Such tickets can be printed out from one's PC, and then traded in a store where a bar-code reader will register the coin transaction. Invisible coins may be constructed from write-once read-many electronic or optical media. They must be read via a dedicated reader. Initially invisible coins are devices where the coin sequence is hidden when the coin is minted, but that subsequently the coin bits may be exposed. The initial cover may be used as proof of "virginity"—indication that the holder of the coin, or the payer of the coin, has not yet redeemed the coin. In practice initially-invisible coins may be constructed by an internal-carbon paper type arrangement, where the coin sequence is printed on a cover paper, and remains invisible as long as the cover remains untorn. To redeem the coin, the holder will tear up the cover, and expose the coin's image. An important class of the write-once coin is the class of "pay and erase"—coins which lose their bit as they are being paid.

1.1.1.4.1.1.1. Pay-And-Erase Coins

These are coins in which the paid bits are erased as they are being paid off. This process insures that the same bit sequence would not be paid more than once. It gives the payee the confidence that the bits paid to him from such a coin where not previously paid by the same payer to someone else. The bit erasure can be accomplished through in-coin circuitry or through an external device. In case of in-coin circuitry, it can be a general purpose on-board computer so programmed, as it would be with smart card implementation, or it can be a dedicated circuitry that does nothing else except erasing the bits as they are forwarded outside the coin. The latter is implementable via a USB stick that would fit to all modern PCs.

1.1.1.4.1.2. Re-Writable Coins

This class of coins may be divided to:—refillable coins—non-refillable coins The former allow for coin bits to be added to the physical device, and the latter will not allow such refill. The only rewriting that this type of coins will allow is status indication.

1.1.1.4.1.2.1. Refillable Coins

These are coins that would accept new coin bits. They act more like an electronic wallet (and often so called), since they are devices that can be used to pay a coin or a split thereof, and to add more coins up to the device capacity. These coins pose a special security threat since the payee can not be sure that the bits therein are not a fraudulent entry. Yet, they are convenient, especially for micropayments.

1.1.1.4.1.2.2. Non-Refillable Coins

Re-writable, non-refillable coins allow for the status data to be updated. Such status data will indicate the remaining unpaid portion of the coin. We distinguish between two types of such coins:—drain-only coins—virtual refill coins Drain-only are coins which are issued at a given value, and as the bits are being paid, a status indicator is constantly updated from the maximum value of the coin down, gradually, to zero.

Virtual refill coins are loaded with many more bits then their denomination rating indicates. If bits are paid, a payment indicator follows this process. However, if the coin holder wishes to reload the coin, and pays for additional value, then the status indicator will climb to the formerly unused bits, and this will amount to effective refill. This procedure comes handy in situations where the coin is mailed to the holder as a physical device, and the holder then wishes to reload it by paying via his credit card. The actual bits of the new coins will not have to travel over insecure channels, since they are already physically resident within the physical coin itself. Example: a user pays for a $10.00 coin, which at the bit rate of 1 bit=1 cent is comprised of 1000 bits. The coin is mailed to the user holding physically 10,000 bits. The status indicator specifies that only 1000 bits are available for payment. The user then pays $5.00, and the status indicator shows that only 500 bits are available for payment. Subsequently, the user adds $20.00 from his credit card account, the status indicator now shows that 2500 bits are available for payment. The new 2000 bits come from the previously unused—but physically present—extra bits. This virtual reloading can happen several times until the preloaded 10,000 bits are totally used.

1.1.1.4.2. Coin Readers

The instruments that read digital coins vary with the language used for the coin. Most common readers are:—magnetic contact readers radio-frequency smart card contact and contact-less readers—optical readers, like bar-code readers—CD and DVD—graphic scanners—direct contact circuitry 1.1.1.4.3. Coin Writers Common types:
1. printers
2. CD/DvD burners
3. direct contact writers
4. smart card writers
5. magnetic writers Printers can write ASCII sequence, or bar-code pattern, etc. Direct contact writers communicate between writer and coin circuitry. Smart card writers may be programmed by the smart card manufacturer.

1.1.2. The Protocol of Image Retention

The mint retains an image of every coin minted, and passed along to a trader. The images accumulate in the Mint's database. The database includes the bit content of the coin, the coin identifier, date minted, date of expiration, type (class), value equivalent, bit value, and possibly PIN id. The database is associated with validity check software, that would check any coin against its image in the database. Since most of those checking will be done when a coin is presented for redemption, this software is also called the payment-check software.

When a coin is checked, it may return one of the following results:
1. coin invalid
2. coin valid, but already redeemed
3. coin valid, and redeemable Coin invalid means that the database does not contain a coin of the claimed sequence.

1.1.3. The Security of Image Retention

The primary security attained through the image retention protocol is the mint security. The primary security projects to the secondary security—traders security.

1.1.4. Coin Manipulation

Coins may be joint, and may be split. Either process may be done as book-keeping, or as a physical action. Joining coins, and splitting coins offers transactional flexibility and convenience.

1.1.4.1. Joining Coins

An assortment of small denominations coins, and partly used coins (split coins) may be joined into a single coin where the bit count is the summation of the bit counts of the joined coins. A trader would simply forward the coins to be joined to the Mint. The Mint will examine the validity of each coin, cancel them, and issue a single coin of the sum value of the cancelled coins. The joined coins may be unassociated with any encryption key or any payment identifier, and in that case, the holder of the coin is assumed the rightful owner. Some or all of the joined coins may be associated with an encryption key or a payment identifier, and in that case the Mint will validate the holder. The joint coin will be issued without any payment qualifier or with one, as the holder requests.

1.1.4.2. Splitting Coins

A coin can be split into two parts by dividing its bit sequence into two sequences without disturbing the bits order. Thus a coin comprised of v bits will be divided into a sequence of v1 bits, and a complementary sequence of v2 bits, such that: v=v1+v2 And the order of bits in the v1, and v2 sequences is the same as the order in the v sequence. If the pre-split coin had no payment qualifier, then neither the split coins will have one. If the pre-split coin was associated with a payment identifier, that identifier is passed along to the split coins. If the pre-split coin was encrypted, then it must first be decrypted before it can be split, and the split coins will have a choice to be encrypted, or not. The split coin will be identified by the remaining bit sequence, and a split-reference-indicator (SRI). The SRI will indicate the split location. The ease and convenience of coin splitting will allow one to purchase a large denomination coin, and split small coins from it as need arises. The receiving trader will take a hold of the split paid coin, and the paying trader will hold on to the other split. This split operation raises some security concerns:—1. payment disputes—2. guessing small coins 1.1.4.2.1. SRI Management The split reference indicator, the SRI, will have always to refer to the split location in the original coin. The SRI for a coin of value, v will be writable with $\log(v)$ bits. That is if it is necessary to identify the exact location of the split sequence. For a split of length s bits, the SRI may be indicated "roughly" and not exactly. According to this procedure the original coin will be divided into intervals of r bits each. This will require v/r possible interval locations (or count). That would require $\log(v/r)$ bits only to identify the interval location. By doing so the split s will be identified with a resolution of r bits. Any of the r bits of the indicated interval will be in a position to be the starting bit for the sequence. We compute now the chance that an arbitrary string of s bits will fit into an interval of r bits. The chance for a string of s bits to be the expected string is: $P(r,s)=1-(1-0.5s)r$ So that a split of 20 bits in an interval of 1000 bits will have only a chance of 0.00000950% to be a right guess. This can be determined to be an acceptable risk.

1.2. Currency Linkage and Independence

We have described a self sufficient currency environment. It is comprised of a Mint that mints digital coins, and traders who trade in them. When the Mint is honest, it spurs the use of its coins, and projects confidence from trader to trader to trust these coins. It is self sufficient in the sense that with such a system one can run an economy whereby goods and services are paid with the minted coins. The question now arises as to what is the relationship between this novel digital currency, and the well established national currency, say the US Dollar. There are three options:—Hard-Link:fixed ratio between random bits and US dollars.

Soft-Link:conditional ratio between random bits and US dollars.

No-linkage: digital currency independence 1.3. Asynchronous Transactions

Most of the proposals for digital cash systems are synchronous; namely the mint, or the bank must be on-line and interactive for a transaction to go through. This is necessary to prevent fraud, especially when it comes to double spending.

Synchronous payment systems are a grave burden. If every minute transaction must wait for the Mint to approve it, then the chances for jammed communication lines are quite high. Frustrated traders will be left waiting for the OK, unable to conclude, even a minute transaction. There were numerous attempts to solve the problem of Mint-on-line, or synchronous transactions. We shall review some of the major ones, discuss their shortcoming, then present the solution afforded by the random bits paradigm.

1.3.2. Random Bit Asynchronisity

This solution is based on the basic paradigm whereby the value is carried by the bit count. This leaves the bits identity free for security measures. This paradigm correlates the level of security with the value of the coin. The higher the value, the more bits there are, and the more bits have a secret identity. We first present the basic principle of partial bit identification, then develop the notion of delegated approval authority, followed by the description of the approval tree.

1.3.2.1. The Principle of Partial Bit Identification

The identity of all the bits of the value to be transacted is an "overkill" in the sense that if a coin holder will correctly present a portion ? of the v bits that constitute the amount to be transacted, then as long as ? is above some low threshold, such knowledge should be sufficient to prove ownership of the coin. This is because there is no conceivable way for the coin holder to know that ? portion without having access to the coin. And access to the coin would expose that person to the entire coin. If ? v is very small then someone could possibly guess the identity of these bits. However, this guessing probability diminishes quickly. It is rated at: $p(?,v)=2-? v$. We may conclude then that a payment of v bits can be approved if the correct identity of only ? v is presented where:

$$0<?<1.0$$

And the higher the value of ?, the less the chance for a wild guess.

This is the principle of a partial bit identification approval of payment.

1.3.2.2. Delegated Approval Authority

The image retention principle calls for recognition of a presented coin for redemption on the basis of the mint checking the bit identity of the presented bits against its own database. If the check is negative the coin is rejected. If the coin was already submitted for payment before, by someone, it is rejected much the same. Only if the identity of the coin is correct, and submitted for redemption the first time, it is honored. This paradigm relies on the mint as the single approval authority. There was no other authority that could approve a payment because no other agent had in its possession the coin image database. This can be changed by relying on the principle of partial bit identification. We define this solution after discussing the fundamental reason for not sharing the coin image database.

1.3.2.3. The Approval Tree

The single extension from the Mint to a delegated authority, DA, can be broadened to a full tree structure.

VERTICAL EXAMPLE

Let a coin of v=36 bits be defined as:
–1 0 1 0 0 1 0 0 0 1 0 0 1 0 0 1 0 1 0 0 0 1 1 0 1 1 1 0 0 1 0 1 0 0 0 1
The Mint's database image will be the same:
–1 0 1 0 0 1 0 0 0 1 0 0 1 0 0 1 0 1 0 0 0 1 1 0 1 1 1 0 0 1 0 1 0 0 0 1
Let I=18 be the least amount of bits in a transaction. Let S=4 be the least number of bits that must be checked to approve a transaction of 12 bits. This will allow one a probability of ⅛ to guess right the makeup of a small 12 bits coin. That probability is under the assumption that the thief knows which bits are being checked by the DA. In general the issue of which of the 12 bits the DA knows their identity is kept secret. At any rate the maximum probability of ⅛ is associated with defrauding the system for the smallest transaction possible. The real I, and S figures will be much higher. This is only for purpose of illustration. Based on I, and S, we can compute the maximum distance towards the next bit: d=I/S=18/3=6

Let us assume that the Mint wishes to give partial bit identification to a child, at a proportion of ?=0.80. Since the parent node is the Mint, we have u=6 (all the bits are known to the Mint). And so: U=int(? u+0.5)=int(0.80*6)=into (5.3)= 5 Beginning with v=0, (the imaginary prebit of the coin), the Mint will now activate a random number generator to select 5 bits out of the next six: bits 1, 2, 3, 4, 5, 6. The selection indicated: 1, 3, 4, 5, 6. The Mint now forms the partial coin image to be handed down to its child. The 'which' beginning string looks like:
which list: 1 0 1 1 1 1 . . . .

Showing that the identity of bit 2 will not be submitted to the child. Bit 6 of the coin is now the "current bit"—the furthest bit which is being reported the child. The Mint now activates the random number generator to indicate which 5 of the 6 next bits: bits: 7, 8, 9, 10, 11, 12 are being selected to be submitted to the child. The selection shows: bits: 8, 9, 10, 11, and 12. So the which list now grows to be:
which list: 1 0 1 1 1 1 0 1 1 1 1 1 . . . .

This process continues 6 bits at a time, and the which list becomes:
1 0 1 1 1 1 0 1 1 1 1 1 1 1 0 1 1 1 0 1 1 1 1 1 1 0 1 1 1 1 1 0 1

30 bits of the coin are marked as "1" meaning their identity would be submitted to the child, and 6 other are marked as "0" meaning their identity will be withheld from the child. The child now receives the following two strings:
–1 0 1 1 1 1 0 1 1 1 1 1 1 1 0 1 1 1 0 1 1 1 1 1 1 0 1 1 1 1 1 0 1
–1 1 1 0 0 1 1 0 0 1 0 0 1 0 0 0 0 1 0 0 0 1 1 0 1 1 1 1 0 1 0 1 0 0 1 1

Where the upper list is the which-list and the lower list is the partial coin image. The identity of the coin bits under a bit marked "0" in the which-list scrambled—meaningless. The child is now ready to approve a coin payment. If the coin holder approaches the child with the coin then the child would verify that 30 bits out of the 36 bits are all correct, and thus approve the payment. The child will then send the entire coin to the Mint which will extend its final approval and pay the child. Now, the child wishes to have a child of its own. The new child (the Mint's grandchild) will have a proportion of ?=0.60 relative to its parent. The current parent (the Mint's child) will now build its which-list to delegate a partial image of the coin to its child. Thus from bits: Starting from bit v=0, the current parent knows the identity of U=5 bits (bits: 1, 3, 4, 5, 6). Among them the number of bits handed down to the child are:

$$U=int(?*u+0.5)=int(0.60*5+0.5)=3$$

The current parent will now activate a random number generator to choose among the 5 bits, 3 to be further identified to the child: Let's say, they are bits: 1, 4, 5. So the which-list for the hand down to the current child (the Mint's grandchild) will be: which-list=1 0 0 1 1 0

Now bit 6 is the current bit. The next 6 bits include 5 that the current parent knows their identify. 3 of them will be randomly selected to be submitted down to the current child.

Thus 3 out of bits: 8, 9, 10, 11, 12 will be selected, and they are: 8, 10, 12. The forming which-list now looks: which-list=1 0 0 1 1 0 0 1 0 1 0 1 . . . . And when it continues for the rest of the coin, the which list finally looks like:

---
which-list = 1 0 0 1 1 0 0 1 0 1 0 1
|..........|..........|..........|..........|..........|..........
1 0 0 1 1 0 0 1 0 1 0 1 1 0 0 0 1 1 1 0 0 1 1 0 1 0 0 0 1 1 1 0 1 0 0 1
---

And the current child will get the coin image for the indicated bits, with the data for the other bits scrambled. Below are three lists: the upper one reflects the which-list given by the Mint to its child, the second one is the which-list given by that child (the current parent) to its child, and the lower one is the partial image of the coin given to the current child (the Mint's grandchild) in order that it can extend independent payment approval to the coin holder. Once such payment is approved, the approval and the submitted coin is forwarded to the current parent who checks the validity of the coin with its which-list which is more complete that its child's list. If it checks out, the approval and the coin are forwarded to the Mint for its ultimate approval. If any of the interim tests fail—a fraud event is being registered, and is eventually being resolved according to the prenegotiated fraud resolution agreement within the various families.

---
ruler: ..........|..........|..........|..........|..........|..........|..........
parent's w-list: .1 0 1 1 1 1 0 1 1 1 1 1 1 1 1 0 1 1 1 0 1 1 1 1 1 1 0 1 1 1 1 1 1 0 1
child w-list: ....1 0 0 1 1 0 0 1 0 1 0 1 1 0 0 0 1 1 1 0 0 1 1 0 1 0 0 0 1 1 1 0 1 0 0 1
child coin image: 1 0 0 0 0 0 1 0 1 1 1 0 1 1 0 1 0 1 0 1 0 1 1 1 1 0 1 0 0 1 0 1 0 1 1 1
---

1.4. Anonymity Management

The anonymity of the currency holder is a central issue. There was a breakthrough in the early 90th when David Chaum and his cohorts invented the cryptographic tool known as a blind signature. This allowed one to develop a protocol by which value can be assigned to a holder of a piece of data without anyone knowing the identity of the coin holder. The fear though, is that the currency issuer might have a trapdoor that would allow it to keep track of the coin owner. Also there were protocols developed to allow an authority to flash out the identity of a digital coin holder, when there is a suspicion of a criminal activity. In short, there was no good solution to the anonymity issue. This random bit currency (RBC) concept offers anonymity that resists wholesale violation. The digital coin minted by the Mints will be offered for sale at retail outlets and unmanned vending machines. Customers will be able to buy these coins for cash without presenting any identification whatsoever. These coins will then be redeemable everywhere. This off-line coin purchase will make it necessary for a tracker to physically track a person to point of sale, and then somehow track which coin he or she purchased. Customers will be able to control their anonymity, and for large coins they might wish to trade their anonymity against security. They will then register the coin with their name and arrange that only when a biometric identification took place will there be a transaction from that coin. An interim arrangement is that a coin holder will register with the Mint through a personally selected PIN (personal identification number). The PIN will then be necessary for coin transaction. The downside is that if the PIN is lost the coin is lost.

2. Implementation Avenues

Three implementation avenues appear worthy of consideration:
1. electronic payment
2. enhancing a working alternative currency
3. issue based implementation.

And also a general effort to secure and promote the concept and the technology.

2.1. Electronic Payment

2.1.1. Competitive Payment Methods
Mainly:
account-based
pre-paid

2.1.1.1. Account Based Electronic Payment
May be based on
general banking account
dedicated payment account (phone accounts)

2.1.1.2. Pre-Paid Electronic Payment
gift cards
dedicated use cards (e.g.: phone cards)

# 2.1.1.2.1. Gift Cards
This mode has gone electronic recently and is hot and popular. It is mostly store unique, but some novel concepts combine several stores in which the card can be redeemed.

2.1.2. List of Basic Requirements
1. security
2. convenience
3. transactional flexibility, (versatility)
4. durability

2.1.3. Payment and Expression Versatility Regimen

The fact that in this concept the security is intrinsic to the expression of value (the identity of the counted bits) allows for unique versatility for handling money: safekeeping and transacting. Also, each digital coin can be attributed with handling rules to facilitate payment and safekeeping requirements.

We shall review:
bit expression versatility
redemption rules
exchange versatility

2.1.3.1. Bit Expression Versatility
Versatility here relates to:
valuation
language

# 2.1.3.1.1. Bit Valuation
Each coin can be identified per its name as to the value of a single bit thereof. One bit could be worth one cent (to be called the nominal valuation), or one bit could be worth $1000, or more. The valuation rate of a bit is affected by security considerations, and payment convenience. Security is carried by the identity of the bits. Obviously to carry $2000 in a valuation where 1 bit=$1000, would reduce the coin to a 2 bit expression, for which one would have 25% chance for correct guessing. However, for transactions of millions of dollars, such bit valuation may be acceptable security-wise. The advantage of high bit valuation is the small size of the coin. A small size may be an advantage when one wishes to hide the coin, or to make a payment through a channel with limited capacity or limited transmission time. High bit valuation may be fit for a niche situation where to two financial centers exchange large amounts of money between them. High valuation will reduce transmission load, and security may be enhanced through bilateral symmetric encryption. Convenience relates to the ability to split a coin to any desired value. Obviously the nominal resolution of 1 bit=1 cent allows for payment of any amount, from the set minimum (security wise) up to the full value of the coin.

2.1.3.1.2. Bit Language

Bit sequence has been expressed in various ways since the dawn of the computer era. Each of these languages can be used to express a coin. Among them are:

raw bit sequence
ASCII representation
Base-64
bar-code 2.1.3.2. Redemption Rules In its purest form, cash should be redeemable by its bearer—whoever he, she, or it may be. The mint should not care to verify the identity of the redeemer, and pay on demand the face value of the coin. However, the ability to constrain coin redemption may have some important advantages that would make it worth while to part with such purity. In particular we wish to consider the ability to reverse coin redemption by the mint, and the case time sensitive redemption.

2.1.3.2.1. Redemption Reversal

Suppose the Mint has the ability to reverse coin redemption. In that case if a coin was redeemed by a thief, the damage can be rectified when the theft becomes evident. This prospect would discourage theft. Consider the situation where Alice sends Bob a coin over an unsecured channel. Timothy seizes the coin in transit, and rushes to the Mint to redeem it. The Mint complies. Later when Bob takes the same coin to the Mint, redemption is refused on account of "coin already redeemed". Bob argues that whoever redeemed the coin is a thief, since Alice intended the coin for him. The Mint investigates and when it concludes that Bob's claim is correct, it reverses the redemption executed in favor of Timothy, and allows Bob to redeem the coin. Presumably, Timothy and his elk, will be hesitant to repeat this theft since it cost him precious reputation, and gained him nothing. The advantage of a redemption reversal scheme is that coins can be communicated in the open with little fear of theft and abuse. This means a whole spectrum of possibilities including emailing money, sending money from one cell phone to another, trading with printed paper marked with bar code, etc. The importance of this scheme requires some careful consideration for proper execution.

2.1.3.2.1.1. Redemption Reversal Protocols

Such protocols relate to:
How to insure redemption reversal
How to validate redemption claim 2.1.3.2.1.1.1. Insuring Redemption Reversal The ability of the Mint to execute redemption reversal may be insured via account payment. If the Mint pays cash to an anonymous bearer of the coin then the Mint has no way to reverse this act. The Mint, therefore, will have to pay into an account from which it can pull back the payment should it become necessary. There are two account categories: one that maintains the anonymity of the payee, and one that voids that anonymity, namely:—delayed escrow account—durable id-account.

2.1.3.2.1.1.1.1. Delayed Escrow Account

This option calls for the payment to be put into an escrow account under the control of the Mint. The payment will remain in that account for a set period of time (delay period). At the end of that time the payee will be free to remove the money from the escrow account to his own disposition. The Mint will open the escrow account without necessarily being aware of the payee identity, and thereby his anonymity will be honored. The idea behind the delay period is to allow time for would be challengers to claim that the payee stole the coin, and demand an inquiry. This delay period can be pre-determined when the coin is minted. The minting date, and the delay period will be part of the coin-id, so that anyone receiving the coin will be aware of the delay period. If the delay period has passed, then a receiver of the coin would be careful to reject it, since if it has been stolen along the line then there is no way to undo the theft. Thus, if the delay period is set to be, say 1 month, then, the coin can be traded as many times as one desires for a period close to a month (since its minting), and then the holder of the coin will be well advised to redeem it. If the Mint says that the coin was redeemed before, the holder will initiate a complaint and the Mint will freeze the money in the escrow account, pending the outcome of its inquiry. If a coin recipients accepts a coin past the delay period, he does so on his own peril. In order for coin holders not to change the minting date and the delay period, this information can be asymmetrically signed, and readable through the Mint's public key.

2.1.3.2.1.1.1.2. Durable ID-Account

The Mint will make the payment to a durable account selected by the payee. The account will identify its owner, and thereby the payee will surrender his anonymity. Such account may be a bank account, or it may be a credit card account. In either case, the payment may be reversed if it's successfully challenged. Although bank accounts and credit card accounts are considered durable, there is the possibility for their holder to cancel them after the payment, and deny the Mint the chance to reverse the coin redemption. This risk may be handled through:

limits on coin value in this system
legal pursuit of the account holder

If the amount of money so handled is small enough, it might discourage a would be thief from going through the trouble of canceling his own accounts. Even if the account is cancelled, the identity of the thief is known, and he can be pursued through all legal channels.

2.1.3.2.1.1.2. Validating Redemption Claim

At issue here are means to resolve a conflict between a redeemer who claims the money redeemed by him was properly his, and a challenger who claims ownership to the same coin, and accuses the payee of theft. The protocol to resolve this conflict might include: 1. Redeemer, when challenged, must surrender the identity of the payer, who paid him with the challenged coin. 2. Redeemer, when challenged, must identify what the coin was paid for, and provide any evidence that the transaction by which the redeemer got possession of the coin was bona fide. If the redeemer can not satisfactorily comply with these demands, then the redemption is reversed, and the coin is handed over to the challenger. The challenger may redeem the coin, and then must stand the same scrutiny as the original redeemer, pending a second challenger. If the redeemer successfully responds to the demands above, then, the Mint will verify the transaction through the alleged payer. (checking with the one who paid the coin to the redeemer) Since the redeemer, and the alleged payer may be in cahoots, it is necessary to demand from the payer to answer the same questions posed to the redeemer. If he or she can not respond satisfactorily to these questions, then the Mint will conclude that the redeemer has no honest possession of the coin, and decide to reverse the redemption. If the payer has responded satisfactorily, then the one the paid him the coin will be approached by the Mint and challenged by the same questions. This, again, is to prevent the chain of three participants to act in cahoots.

2.1.3.2.1.2. The Practice of Redemption Reversal

Redemption reversal is envisioned as a powerful, and eventually popular practice. The Mint will designate a special class of coins for such trade: alpha-coins. Alpha-coins will offer alpha-anonymity (explained below). They will open the gate for a wide array of convenient payment procedures, at the expense of a possible payment conflict resolution (according to the redemption reversal protocols).

We further discuss:
alpha-anonymity
cost of redemption reversal

2.1.3.2.1.2.1. Alpha Anonymity

We may distinguish between two types of anonymity: one in which anonymity is required for each and every single action from a given set thereof. The other is when anonymity is required for the set as a whole, but not to a small subset thereof. The first case will be called complete anonymity, and the second case will be called alpha anonymity. A large number of people are concerned about the power that credit card companies and government agencies have over them by virtue of knowing their exact spending, and travel pattern, over the years, over large and small transactions, all without any forgetfulness. This is the Big Brother syndrome. Such concerns are associated with the full bulk of behavior. There is little or no concern over occasional knowledge. That is, if the government will know of a particular book bought some months ago, or a particular restaurant frequented last year, then such information will not be deemed offensive to many in the general public. Trading with alpha-coins will satisfy alpha-anonymity concerns. This is so because the effective means to battle fraud and errors expressed in the redemption reversal protocols, will inhibit the would be thieves from trying to steal alpha-coins, and in the same way would discourage negligent coin handlers from erroneous double payment. They will likely be caught, embarrassed, and lose their good reputation. This deterrence and discouragement will mean that for most alpha-coins transactions there will be no theft or errors. One would redeem the coin, and suffer no challenges. In that case only the circulator, and the redeemer will expose their true identity, all the passers of the coin will remain anonymous. Thus a typical trader will reason that out of, say, 100 coins traded, one coin will be challenged, and the resulting audit trail will expose his identity, but the other 99 coins will not be challenged and so the passer identity will not be exposed. This is exactly alpha-anonymity. And it is therefore that it is expected that the public at large will opt for the great flexibility offered by alpha-coins in conjunction with its assurance of alpha-anonymity.

2.1.3.2.1.2.2. Cost of Redemption-Reversal

Running the audit trails and resolving payment conflicts will be a cost incurred by the Mint. The Mint will compensate itself by deducting that cost from the value of the coin. The eventual redeemer of the coin will be the party to pay the procedure that insured him getting his money. The cost of the redemption reversal will be proportional to the aggregate length of the audit trails.

2.1.3.2.2. Time Sensitive Redemption

One must be concerned with the burden of maintaining the coin image database responsive for immediate approval. The worry will increase with success and popularity of the system. If every minted coin, however old, must have a live record in the Mint's database then the database will be weighted down by long forgotten, and lost coins. This specter can be alleviated by setting up redemption period. Say, for a 1 year post minting date, the coin is "live". Post that the coin is archived somewhere, with a slower access. A redemption attempt after the "live" period will take extra time, and will cost extra money. This can be graded. There will be a first archive for coins 1 yr-3 yrs old, a second for 3 yr-7 yr old (takes more time to redeem, and cost more money too), etc.

2.1.4. Loyalty and profiling

One of the salient aspects of modern commerce is the practice of loyalty rewards whereby vendors create a faithful following, as well as the practice of profiling the consumption habits of consumers. In contemplating the anonymity oriented random bits platform, one must ponder on its impact on the aforementioned. It turns out that both loyalty rewards, and consumer profiling may be alive and well despite the anonymity comfort offered by random bits currency. This is on account of the notion that for both loyalty and profiling ends, there is no need to expose the actual identity of the consumer. All that is needed is to create a file of consumption habits associated with a given consumer—who might remain anonymous. The consumer will get the loyalty rewards, and his or her shopping habits would be extensively profiled, yet his true identity will be replaced with a virtual identity. To effect this the consumer would be able to register with a virtual identity, and then link all his digital coins to the same identity. The spending habits of that consumer will be logged by the Mint who will offer it for sale to loyalty projects, and to marketing profilers. The virtual identity will be identified via a dedicated email, where the consumer would receive all the targeted offering that the extensive profiling has produced. Below we describe some particular loyalty concepts implemented via a local utility, and hotel chains.

2.1.5. Public-Key Based Anonymity and Security

While the security of the bank is based solely on the coin image retention protocol, it is possible to use the less secure public-key cryptography to achieve traders anonymity, and payment security. The procedure calls for traders to select a pair of private and public key. Alice circulates a coin with the Mint, paying for it eponymously, from her bank account. She notifies the bank of a named payee identified through his public-key. The public key which Alice communicates to the Mint may be her own, or one that belongs to Bob. The bank does not know the identity of the owner of the assigned public key. The owner of that public key, (let's assume it is Alice), will sign the coin with his respective private key, and redeem it with the Mint. The Mint will verify the signature with the assigned public key, and honor the redemption request. Alice will ask to redeem the coin against another coin of same denomination. Now, Alice is the circulator of record of the new coin, where her identity is specified only via her public key. Alas, she has all the rights assumed by a coin circulator. When Alice wants to pay Bob, she asks him to pass to her his public key (a public key of his), and she uses her circulator status to name Bob as the payee for that coin, (the assignment is signed with Alice's private key to prove her identity). Alice, then emails the coin to Bob. Bob will sign the coin with his private key, and redeem it with the Mint. The Mint will verify that the coin was signed by Bob based on Bob's public key which Alice designated, and honor the redemption request. Bob may redeem the coin against another coin, for which he is the circulator, capable of naming a payee of his choice. Any eavesdropper who picked the coin while in transit would not be able to redeem it because he would not have Bob's private key. Eventually a coin holder will be able to walk into a Mint outlet, present the coin, and exchange it against cash, without revealing his identity. Alternatively, Bob would redeem the coin to his bank account, and surrender his identity. Alas, the Mint will have no knowledge of the trading chain that took place until the coin was redeemed. The Mint will be able to construct a list of traders starting with the circulator. But the list will identify the traders by their public key, and nothing more. When the Mint, or the authorities would inquire with Alice, who is the owner of the public key she named as payee, she might be able to identify that person, but then again, she might not. There would be no way of telling which is the case.

2.1.5.1. Comparison Between Alpha Trade and Public Key Based Anonymity

Alpha trade engages less upfront work on the part of the Mint, and so it would be less costly for traders. It is also quicker, and less cumbersome for the traders. Yet, alpha trade only offers prospective anonymity, while public key based trade offers anonymity which is as robust as the public key encryption employed in the process.

2.2. Enhancing a Working Alternative Currency

There are several alternative currencies in operation. Any of them could be enhanced via the digital currency.
   rewards points
   bonus coupons

2.2.1. Reward Points

Businesses often are willing to invest in ways which keep their customers loyal. The common principle is to offer value in proportion to spending volume. Using this random bit currency configuration, it is possible to generate customer's reward with maximum benefit for the business. The idea is to offer the reward in a form of a unique non-dollar equivalent currency. Such currency may be called "reward points", or "points". Unlike cash rebates, reward points can only be spent on merchandise offered for sale against reward points by the issuing business. This control allows the business to stuff the "reward store" with rather obsolete, hard-to-move merchandise. Since the customers buy this merchandise with gifted points, their purchase decision threshold is rather low. Reward points, customarily, are computed as a percentage of sales, and their allocation is done via the services of some credit card company. This modality makes it difficult to reward non-credit card customers, and it severely limits the flexibility of the business to use this reward points for maximum benefit. By issuing reward points coins, the business will enjoy unprecedented flexibility. The coins can be handed out in various circumstances. A customer could not find what he looked for in the store—the manager hands him out a reward point coin. A waiter spilled water on a guest—the guest is pacified with a reward coin. The coin may house the points electronically or in printed manner. Specifically, the coins may be burned into a credit-card size CD-ROM which the user can insert into his home computer CD port, and from there upload the points to his point accounts at the business website. The points on the account can be used to purchase items from an on-line catalog, where that special, hard to move merchandise is offered for sale. The reward points will be accounted for through a dedicated Mint which will keep a database of all issued coins. This will insure that cheaters can not manipulate the data to log points fraudulently. The coins may come with preset expiration dates, that would prompt the receivers to use them timely. These coins can operate in parallel to any existing reward program based on credit card sale.

2.3. Issue Based Implementation

To identify an issue which can be helped via the digital currency. Such may be the cause of charity.

2.3.1. Charity Enhancement Option

We describe here how to use the random bits currency to enhance and promote service and charity in a community. The idea is based on dollar-unlinked digital currency. We first elaborate on the participating elements, and then outline their working.

2.3.1.1. Charity Elements

They are:
Charity Mint
Charity Contributors
Charity store
Charity Earners (charity service providers).

2.3.1.1.1. The Charity Mint

This would be an organization that would mint charity currency in the form of digital coins. We assume, for the sake of presentation, that these coins take up the form of a "nut" as described in the physical coin section. These charity nuts would come in several denominations: 10 points, 25 points, 50 points, etc. Or we may refer to these points as "pearls" since they represent a pearly action, as will be seen forthwith.

2.3.1.1.2. Charity Contributors

Certain individuals and organizations will be asked to contribute to the charity operation. The contributions will have to be one of a kind, or items that are not traded outside the charity marketplace, and hence have not dollar value assigned to them. This would fit perfectly for a host of works of art. An original painting is one of a kind. If the painter is not rated, his work has no known monetary value. Writers who wrote books that are not in commercial circulation will be able to offer copies of these books in the charity marketplace. Another source of contributions may be celebrity touched articles. A toaster used by Michael Jackson for a day may have a value that is not appraisable by examine the price of similar toasters not touched by Michael Jackson.

2.3.1.1.3. Charity Store

This would be a store where the items contributed by the charity contributors would be gathered and displayed. The store may be of the brick and mortar variety, or it may be a virtual store: a WEB catalog. In the store, all items will have a price quoted in charity points, or charity "pearls"—not in dollars.

2.3.1.1.4. Charity Earner (Charity Service Providers)

These are individuals who contribute their time to a charitable cause. Each hour of such contribution will earn the contributor a set amount of charity pearls. At the end of the day, or the week, as the case may be the earner will get a digital coin with charity points representing the extent of charitable work done.

2.3.1.2. The Charity Process

Project organizers will advertise the charity store to the public, and explain that to buy items in this store one would have to earn charity points, ("pearls") by doing volunteer work. No amount of dollars will redeem any item in the charity store. If the articles in the charity store are attractive enough, then it would serve as a motivation for individuals to volunteer, and earn charity pearls. People who are willing to volunteer but procrastinate will be spurred to go ahead right away. The store, for example, might feature a concert by a popular musician or band. There would be no way to earn an admission to that concert by opening a wallet. The only way to buy tickets is to pay for them with charity pearls. The concert goers will know that the people around them are all charitable people, and not just wealthy contributors. The charity pearls may be embodied in distinctive charity nuts, which people might display in a chain form on their body, boasting of their volunteer work.

3. Physical Coins

The digital coins will be implemented on a physical device. We discuss the requirements for this device—the physical coin, and some design options.

3.2. Design Options for the Physical Coin

We divide these options according to the coin reader, and potentially coin writer.
1. personal computer (desktop and laptop)
2. PDA & Phone
3. Payment Station 3.2.1. Personal Computer Ready Coins Such coins may access the PC in various ways:
1. USB Access
2. CD drive
3. Parallel Port
4. Serial Port
5. PC card slot The access may be direct or via an intermediary equipment.

The most attractive input appears to be the USB port. The coin might have direct USB extension, or it may be accessed via a reader/writer which is the one to be USB connected to the computer.

This leads to the following list:
data cards (smart or dumb)
RF transponders
Infra-Read readers/writers.

The direct USB device may be made in a very robust way, and be equipped with strong security electronics.

3.2.1.1. Direct USB Device Options

Possible shapes:
1. finger shaped
2. nut shaped 3.2.1.1.1. Nut Shaped Direct USB Coin The nut shaped device would be comprised of two parts: the USB heart, and the USB cap. When the cap is snapped on top of the USB extension the device assumed the shape and size of a small walnut. This nut can be sealed with a sealing tape to identify itself as unused, and thereby facilitate trading without real time exposure to the Mint. The USB heart part will have a USB port at the opposite side. This would allow for USB hearts to be threaded together into a prolonged device with a single protruding USB extension. This combined device will then be snapped into a computer's USB port, and the digital coins from all the "nuts" will be read sequentially into the computer, as needed. This would allow a user who accumulated several nuts to unload them to his computer without having to plug one out, and plug the next one in. The USB heart part will be equipped with metal "ears" designed to fit together like links of a chain. This would allow one to threat any number of nuts into a chain. The chain can be worn as necklace, a bracelet, a belt, or in any other amusing way. The chaining of nuts will offer some security against losing them.

3.2.2. PDA and Phones Ready Coins

These two devices are still evolving into a dominating popular standard, and on their way to merge. One way or another they would allow for an entry port of a thin device that will also be the port for the digital coin.

3.2.3. Payment Station

Transportation systems, gas stations, fast adopt a wireless transponder reader that can be used for instant payment. The digital coin will fit into this technology. Instead of reading account based information, or dedicated prepaid currency, the digital coin will transfer its coin image as a form of payment. The up and coming smart card will be able to serve as the payment station equivalent to the cash-stick. The on-board computer will be hard programmed to erase bits which are being paid, to foil double spending. The card will be reloadable, and used either with specified identity, or anonymously.

Anonymous smart cards will be purchased for, say, cash or credit card, in a dispensing station. The computer chip will be used to load new coin bits, and to pay-and-erase loaded bits. The payment station will only verify the coin bits, and will have no knowledge of the identity of the payer. If the physical security of the card is trusted, then the contact-less (or contact based) payment can be locally approved without any further checking. To so practice it will be necessary to design good security on the loading end, to insure that only proper coin bits are being loaded. This can be done using a card-stored encryption key that would be used to authenticate the loading device. Such an anonymous smart card can be branded. Namely, some store will offer the cards for store purchases at a discount. The stored coins can be used elsewhere, but without the discount. This would incentivize store customers to employ the card, while the same people would not purchase a gift card that limits the cash to that particular store. Eponymous smart cards, will house the identity of their holder, and may be activated pending a PIN id, or a biometric reading. In that case the on-card money can be used for alpha-trading. The payment station will give the user the option to punch in an email address, or phone number to which the money would flow—assured by the procedural security of alpha coins.

Anonymity Controlled Payment Online

Elaboration

A solution to fulfill the growing need to make payments online while managing and preserving anonymity for both payer and payee, one vs. the other, and both versus any third party. The solution is consistent with the war on terror.

*: 1. Introduction

*: 1.1. PURPOSE: To satisfy legitimate needs for internet surfers to pay and get paid while managing their anonymity. To make it easier for individuals and small businesses to pay and get paid without expensive or elaborate settings, thereby promoting the Internet as a global marketplace, contributing to global peaceful cooperation.

*: 1.2. MANAGING ANONYMITY: In the physical world people manage their anonymity by paying cash vs. paying checks, controlling what is printed on their business card (yes home phone, no home phone), wearing uniform and insignia, carrying a badge, an id-card etc. The needs that govern this actions are also present on the Internet. But meeting them is a different challenge. A person dealing with another person often wishes to maintain a degree of anonymity with that person. Sometimes this desire for anonymity is absolute, meaning no one should know who they are, and sometimes it is limited, where some trusted third party knows the identity of the person. Society as a whole has a requirement to prevent law breakers, criminals, terrorists from abusing the anonymity freedom extended to its law abiding members. The challenge, is then how to extend anonymity management capabilities to law abiding citizens, and prevent the criminal element from abusing the same.

*: 1.3. THE ENVIRONMENT: The relevant environment for the basic setup is comprised of the following players:

A trusted financial entity (bank)
An account opener
An account closer
Anonymous traders
Law enforcement authority
A financial thief (hacker)
A money launderer
A terrorist
And the following objects:
A global network (internet).
trading accounts Personal accounts

*: 2. The Basic Operation

*: 2.1. THE OVERALL DYNAMICS: Using the global network, Alice, the account opener opens a trading account with the trusted financial entity, "the bank". She secures the account with a random password of her choosing. Someone calling himself Bob makes online contact with Alice, and she then intends to pay him the sum that she put in the trading account. To do so Alice passes to Bob the account password. Bob, using that password first verifies that the account has the expected sum, and then changes the password. At some later point in time Carla makes contact with Bob, and Bob passes to her the current password. Carla repeats Bob's procedure with the account, setting up her own password. She will then execute the same procedure vis-à-vis David, and David will do the same vs. Esther and so on, the control over the trading account is passed along from one trader to the other, until at some point a trader called Zachary decides to close the account. Zachary expresses this wish to the trusted financial entity, and the contents of the trading account is moved to Zachary's personal account, which concludes the account sequence. At any point of time there are many trading accounts being opened, being closed, and being traded through password conveyance. At any point in time there are many trusted financial entities that operate the same. The net result of this scheme is that people all over the global network have the option to pay and get paid anonymously.

*: 2.2. ANONYMITY: Anonymity is achieved via a procedure by which a payer can pay a payee of whom he or she knows nothing else except that they are present at the other end of the communication channel. To facilitate the discussion we shall call the payer Alice, and refer to the payee as Bob.

Alice could use the open channel to Bob, and convey to him the password to her password-activated trading account. Bob will use that password to access Alice's account, confirm its contents, and immediately thereafter change the account password. Upon so doing Bob assumes control of the money in the account. Alice has no longer access to the account. Alice thus paid Bob who was completely anonymous to her. Suppose now Bob wishes to pay a person with whom he has an open channel, and her name is Carla. He repeats this procedure and give Carla control of the account. Carla will do the same versus one calling himself David. Carla is anonymous vs. Bob and vs. David. If David repeats the same procedure, he too is anonymous vs. Carla and his payee. The same account will be passing from one internet user to another by passing control through passing a password. Of course, Bob may be known to some extent to Alice, and Carla to Bob and so on. There is no requirement that the payer and the payee should be completely anonymous vis-à-vis the other. PINpay will work though with complete two-way bilateral anonymity. Alice, who started this PINpay sequence is of course known to the bank that maintains the account. She transferred money from her personal account to the trading account. So is Zachary, the trader who decided to cash the account by transferring its content to his personal account with the bank. The bank then knows the starter of the PINpay chain, and its closer. The bank is clueless though of the identity of Bob, Carla, David, etc. . . .

Even Alice and Zachary can achieve anonymity if the bank would allow it. Alice can walk to the bank with a cashier check, or cash, and open the trading account, and set the first password. Zachary will walk to the bank present the current controlling password, and claim the account in cash, without identifying himself. The bank will know how many traders had passing control of the account. This will be evident by counting how many times the password has changed. This knowledge may become a basis for a bank's fee. Taking money from the account for every trade (change of password).

*: 2.3. SECURITY: We analyze security vis-à-vis two types of threat: eavesdropping, and man-in-the-middle. Eve will be the name assigned to the Eavesdropper, and Mort, the name assigned to the man in the middle. Eve will have complete visibility of the conversation between Alice and Bob (the payer and the payee), but she will be passive and will not interfere between the two. If she learns enough she might try to steal the money that Alice conveys to Bob. Mort, on the other hand, will see what Eve sees, but will communicate with both Alice and Bob for the purpose of stealing the money of the transaction. Mort, of course, is the bigger danger.

*: 2.3.1. EAVSEDROPPING SECURITY: If Alice would send the password to her account to Bob over an insecure channel, and in the clear than Eve, the eavesdropper, could read it as well, and beat Bob to the punch. Access the trading account before Bob, and quickly changing the password. She will in effect steal the money, with either Bob, or Alice, in some combination perhaps paying for that loss.

If Bob was known to Alice, and they had the opportunity to exchange a secret key over a secure channel, Alice could use that shared secret to frustrate Eve, and send Bob the password securely. But if Alice and Bob are strangers to each other then they may use one of the following options:

1. public key cryptography
2. PINprivate

*: 2.3.1.1. PUBLIC KEY CRYPTOGRAPHY FOR SECRET SHARING Bob would send Alice his public key. Alice would use that key to encrypt their shared secret, and Bob would use his private key to decrypt it. Eve, without the secret private key will remain in the dark, and unable to steal the money. Bob will then access the trading account, using the secret password Alice just sent him, and immediately change it so that Alice will lose her access to the paid sum.

*: 2.3.1.2. PINPRIVATE SECRET SHARING: The PINprivate way for Alice and Bob to share a secret is a solution based on the principle that it is sufficient for Bob to have a short time advantage over Eve. Bob would use that time to access Alice account, and change its password. Eve coming a bit later to the same account is unable to access it because she does not know the new password. The challenge is thus reduced to creating a short time advantage for Bob over Eve. This can be achieved by a procedure that would require Eve to take on a computational burden greater than Bob's. Such computational disparity can be achieved through the principle of random selection among several computational candidates. Bob will make a secret selection unknown to Eve who would be forced to compute on average half the number of computational tasks. This extra work will give Bob the time advantage he needs. Below we describe the PINprivate procedure stepwise then analyze it.

*: 2.3.1.2.1. THE PINPRIVATE PROCEDURE: The PINprivate procedure is based on specially tailored one-way functions, elaborated-on below. Alice prepares n computational tasks that are believed to be strong one-way functions. These tasks are prepared before she begins communication with Bob. Every task is defined through an input value, x, a one way function, f, and a result f(x). So Alice is ready for her session with Bob by having constructed a table in the form: task #—x—f(x)

When Bob calls in, Alice presents him with the list of n tasks. That is, she defines f, and provides the value x for each of the n tasks. Bob randomly selects one task, and computes its result. He communicates the result, f(x) back to Alice.

Alice checks her look-up table and from the value f(x) she finds out which of the n tasks were chosen by Bob.

Alice acknowledges to Bob that she now knows his choice (among the n tasks), and then both Alice and Bob continue to compute the same function to the next computational milestone (see cryptographic appendix for a definition of milestone computing). Soon thereafter, both Alice and Bob finish their computation, and each is in possession of the result f(x) of same computational task. That value, namely f(x) becomes the short-lived secret between Alice and Bob. Eve, who is privy to their information exchange will know which tasks Alice gave Bob to choose from, and will know the result of Bob's computation in the form of f(x), but since Eve is not in possession of Alice's look-up table, she does not know which task Bob has selected. The only way for her to find out is to compute herself the n tasks, one by one, until one of them evaluates to f(x). Once she finds out she too can compute f(x), and discover the secret shared by Alice and Bob. But since Eve has to do more computation than Bob, Eve will incur a delay. It is that delay that is being exploited by Alice and Bob. Since f(x) is a one-way function, Eve cannot fast reverse compute f(x) to x. Alice controls the value of n and the computational burden of forward computation, and hence Alice and Bob control the delay, or the lifespan of their temporary shared secret.

*: 2.3.1.2.1.1. PIN Private TAILORED ONE-WAY FUNCTIONS

These are one way functions which also are:
computable as a series of computational milestones
accepts at-will large input
evaluates to at-will size output

*: 2.3.1.3. COMPARING PUBLICKEY WITH PINPRIVATE: There are several important cryptographic distinctions that are discussed in the cryptographic appendix. The important one is the fact that PINprivate can be activated ad-hoc, by any two parties, regardless of their sophistication and the quality of their computer. Alice and Bob, using PINprivate could download the necessary software, just before the exchange. They have no need to be ready with a secure pair of private/public keys, there is nothing to steal, nothing to be done ahead of time. Two strangers may decide on the spur of the moment to have a monetary transaction, and PINprivate will enable them.

*: 2.3.2. MAN-IN-THE-MIDDLE SECURITY: A passive man in the middle (MIM) cannot be distinguished from a blind channel, and cannot be countered. But a passive MIM is equivalent to Eve the total visibility eavesdropper. What we are concerned with here is active MIM, where a MIM, or "Mort" cheat and talk to Alice as if they were Bob, and talk to Bob as if they were Alice. We shall first describe the standard MIM fraud, then describe countermeasures.

*: 2.3.2.1. THE STANDARD MIM FRAUD: In the standard MIM fraud Alice, after receiving some consideration from Bob agrees to pay him a sum, S. She activates the PINprivate procedure described above. As she does so MIM talks back to Alice as if he were Bob, and initiate a talk to Bob as if he were Alice. So Alice executes the PINprivate procedure with MIM, unwittingly passing to him the password to the trading account, while MIM fakes the same procedure vis-à-vis Bob. At the end of the two procedures, MIM accesses the trading account, and takes control of its money while Bob will access a fake account, or a proper account with a bad password, or a proper account, proper password but no, or less money. Since Bob maintained total anonymity versus Alice he cannot successfully complaint because he cannot prove that he was the one originally intended to be paid.

*: 2.3.2.2. MIM COUNTERMEASURES

The are:
1. Trading code. & Heuristic Interrogation
2. Bank's delay
3. Veto Power
4. trusted bank And they can be used in any combination.

*: 2.3.2.2.1. TRADING CODE AND HEURISTIC INTERROGATION: Alice and Bob are likely to have had some communication between them before they activate the PINprivate procedure, usually Alice will not out of the blue decide to pay Bob some money. This prior communication may be used to exchange a trading code that would be featured in subsequent PINprivate communication. The code may be added to the x-values for the computational tasks. MIM without knowledge of the code will not be able to compute any task correctly, and Alice will realize that something is amiss. Otherwise Alice and Bob can cross interrogate each other over what transpired between them beforehand (heuristically) and thereby flush out that they are now talking to MIM. This countermeasure can be well handled by MIM passing the queries between Alice and Bob to each other.

*: 2.3.2.2.2. BANK'S DELAY: The bank may introduce a standard delay in switching control through password change. So MIM claiming the money in the trading account will be frozen off for a set period of time. Bob, realizing that he was cheated will immediately complain to Alice and the bank. Such a complaint will send the account into limbo pending a subsequent resolution. This possibility should deter MIM from using this trick.

*: 2.3.2.2.3. VETO POWER: The money transfer may include a veto step. After Bob changes the password, denying Alice access to the funds, he still has no control of the money, pending a release of a veto holding signal Alice keeps on the account. She would release the hold when she is convinced that Bob, and not MIM has claimed the money. She could also use the veto power to ascertain that she gets whatever it is she is paying for.

The veto procedure will give Bob an opportunity to claim that he was cheated out of the money. Alice will then keep the veto signal until the matter is settled.

*: 2.3.2.2.4. TRUSTED BANK: Alice and Bob may maintain mutual anonymity but expose themselves to the bank. For anyone to access the account he will have to first cross through a bank firewall that would check his bona fide. If MIM is registered with the bank then when his fraud is discovered the money is returned.

*: 3. ADVANCED OPERATIONS

Some advanced operations are hereby discussed:
Loan
exchange

*: 3.1. LOAN: Alice may pass Bob money as a loan with a collateral. The bank will put a lien on some Bob's asset, and release it only when Bob pays Alice back, with proper interest. Alice will execute an agreement with Bob on the terms of the loan. This way Alice would be able to make a loan to a stranger relying on the bank to properly secure it with some of Bob's assets, or by an asset of a vouching third party.

*: 3.2. EXCHANGE: Whatever Alice executes towards Bob, Bob can simultaneously execute towards Alice, the two of them having an exchange. They may trade dollars vs. yens, pounds vs. Euros etc. They may trade dollars vs. coupons or loyalty points, or they may trade some digital goods for money. In that case Alice and Bob will hold mutual veto power each over the other and the bank will oversee a simultaneous release of both veto signals if so instructed by both.

*: 4. FIELDING: Once this practice catches on, merchants will realize that they can get paid directly by their customers, and don't need anymore to abide by the rules, and pay the cuts for the credit card companies. Trading accounts will proliferate with a range of denominations, to allow Alice to pay arbitrary sums to Bob using a several accounts.

The software for the operation will be packed on Internet sites ready to be downloaded, and activated on each computer, depending on one's capability. Small phone computers will have less computational burdens, and large heavy duty server computers will have a greater computational burden.

This PINpay procedure will connect people internationally.

Banks will enjoy this arrangement because they don't have to pay interest on money that effectively is deposited with them. They can also charge a fee for every switch of password.

*: 5. THE WAR ON TERROR

Governments make great attempts to monitor money flow to make life difficult on criminals and terrorists. The challenge is to respect this drive while also acknowledging that convenient payment on the Internet is inevitable, and therefore it's better that it should be offered in the US or the West in general before some shady corners take the lead. Government will have more control over cash payment on the Net than it has with paper bills. That is because in order to materialize any virtual assets, the owner needs the consent of the bank. The bank may be under court orders to freeze any account pending the identity exposure of its holder. That way the government could pinpoint any suspicious account, and criminals and terrorists will know it. Also, the government can limit the accounts so transacted to a small amount, making it infeasible to use this procedure for heavy duty financing.

*: 6. CRYPTOGRAPHIC APPENDIX

Short-Lived Shared Secret Between Online Strangers.

Using Symmetric Cipher*Acquiring a Durable Secret*Anonymous Online Payment

Abstract: Alice using her computing power prior to her exchange with Bob, and Bob using his choice power during the exchange, both using a Master One-Way Function, will realize a short-lived (shared) secret (SLS), which Eve will uncover only after the secret would lose its validity. The SLS can be employed to acquire a durable secret without resorting to public-key cryptography, and it can be used to implement an anonymous online payment. Alice and Bob, two strangers online, will generate a short lived secret between them so that Eve, the Eavesdropper, would be delayed in uncovering that secret. This Short-Lived Secret (SLS) procedure is based on an instance of a Master One-Way (MOW) Function [1]. The procedure:

(1) Alice would set up an instance of an MOW function, and compute it for n input strings: $\{x\}n$: $x1, x2, \ldots xn$, yielding $y11, y12, \ldots y1n$, where $y1i$ is the output of the selected MOW function per milestone 1, with $xi$ as input.

(2) Alice communicates the MOW function, and $\{x\}n$ to Bob, through their unsecured channel.

(3) Bob randomly picks $xb$, ($b$ ? $\{1, 2 \ldots n\}$), and computes $y1b$.

(4) Bob communicates $y1b$ to Alice.

(5) Alice realizes the value of b from $y1b$ (through her a-priory lookup table).

(6) Alice and Bob each computes $y2b$ (the 2nd milestone corresponding to xb).

(7) $y2b$ becomes Alice and Bob short lived secret.

Analysis: Eve is privy to all the information exchange between Alice and Bob. So she is aware of $\{x\}n$, and knows the value of $y1b$ Bob communicated to Alice. But unlike Alice Eve cannot infer the value of b from $y1b$, and so she cannot compute $y2b$ right away. Eve will be able to compute the first milestone values for the entire $\{x\}n$ list, and when she does so, she would know the value of b, and readily compute $y2b$. Eve would need, on average to compute 0.5n instances of the MOW function. Since Alice determines the value of n, Alice can control the delay sustained by Eve, based on a rough estimate of Eve's computing power. So Alice and Bob would share a short lived secret where the life span of that secret can be credibly estimated.

Using MOW function Alice controls the forward computational burden, and sets it for t milliseconds based on Bob's computing power. In that case the expected lifespan of their shared secret would be (0.5n−1) t? milliseconds, where ? is the computing advantage of Eve over Bob. If Eve and Bob have similar computing power than ?=1.

Using MOW function Alice would be able to set the size of the $\{x\}n$ strings to be sufficiently large to prevent Eve from preparing a master lookup table. Also, Alice can choose different MOW parameters (?, aij, and ciphersytems) each time. Alice can also set at will the size of the y values to reduce at will the chance for a lucky guess of the shared secret.

Acquiring a durable secret: Alice can place a durable secret in a password protected URL. Alice would then communicate to Bob a value $z=f(p,SLS)$, where p is the password, SLS is their short lived secret. Aware of SLS, Bob will compute p, use it to access the URL, acquire the durable secret, and erase the contents of the URL so that by the time Eve computes her way to uncover the SLS, it's no longer valid.

Comparison with public-key exchange: Rather than using the proposed short-lived secret protocol, one could use a public key protocol to generate a durable secret, as is so commonly done. The difference in the nature of these two protocols creates circumstances where each one has advantages over the other. The main attribute of the proposed SLS protocol is that neither Alice, nor Bob have to be pre-equipped with a secret key. This implies that both Alice and Bob may be unsophisticated, with plain computers. The common application of public key secrecy calls for one party, "the server" to be sophisticated enough to feature its unique well designed public/private keys pair, while the other party may be unsophisticated. Using SLS Alice will start preparing the n computational tasks, nt milliseconds before her conversation with Bob, (assuming t is the time needed to compute one MOW function task). So before time −nt (compared to the start of the conversation), neither Alice, nor Bob have any secret to guard, nor any secret for an adversary to steal. This implies that Alice can generate the shared secret with Bob through any computer she operates. Alice does not need to get from some trusted authority a pair of public/private keys. Alice also can choose the specific nature of the MOW function to match her and Bob's computing power, and plan the lifespan of the secret. Alice and Bob will be able to download the MOW function, and the exchange protocol from an available Internet source, automatically, and without any sophisticated registration. This is important for anonymous online payment since the payer and the payee may both be unsophisticated online surfers, with plain computers. There are precious few public key ciphersystems, and they are all under extensive attack. Once they are cracked they void the protocol that relies on them. The MOW function may be adjusted to remove any broken one-way functions in it, and replenish it with newly conceived ones. As long as there is a single surviving one-way function, the SLS will survive. If Alice keeps using her public/private keys, her adversary may take his time to break her particular pair and violate the protocol. With the SLS, an adversary cannot invest in breaking the secrecy ahead of time.

He cannot crack something and use it for subsequent feats. Every SLS exchange will require a complete ground-up, real-time cryptanalysis. If the SLS will be widely used by the public to effect anonymous payment then there would be too many exchanges to crack, and each case will be an independent cryptanalysis challenge. The SLS has the flexibility to employ very hard one-way functions with heavy duty forward computation, or conversely, very easy to compute functions. The latter may be used for small denomination payment and/or mobile phone or other limited power computers. The adjustment can be made on the fly, exploiting the milestone computability of the MOW function. The SLS protocol could also be used between two very powerful parties. If Alice and Bob represent major computing centers then they may use SLS with heavy duty forward computation, (exploiting the attribute of milestone computing) making it quite infeasible for nominal adversaries to violate their security. The computational burden will serve as a proof of identity, because a less powerful computing node will not be able to compute the forward result fast enough. Lastly, one could implement both. Bob could send Alice a random sequence encrypted with her public key. Alice will decrypt it with her private key, and then both will use the shared random sequence as a symmetric key to communicate the SLS through it. Hence if Alice's private key was stolen or cracked, there would be another line of defense in the form of the SLS protocol.

The fact that SLS can be adapted to the computing power of one's party can be exploited by two high-powered computing stations against the threat of a man-in-the-middle that will masquerade as the other. Alice and Bob would impose on each other (see symmetric application below) a forward computational burden commensurate with their computing ability. Any intruder masquerading as a bona fide party would not be able to compute so fast, if that intruder does not have the matching computing power. This performance lag will be viewed as a suspicion indicator.

Special Features:
Symmetric Application

Whatever Alice executes vs. Bob, Bob can execute vs. Alice, in functional symmetry, but of course using different tasks, with their computational burden adapted to Alice's means. When done, Alice and Bob will combine the two shared secret to a single one, by concatenation or otherwise. So doing will encumber Eve with the requirement to chase both Bob and Alice's computational tasks.

Cascading Application

The short-lived temporary secret between Alice and Bob can be used for Alice to exercise another round of same procedure, only that now Eve will have a delay before she gets all the information, (the time needed for her to get reveal the first secret that is used to deliver the second round data). That a-priori delay would add to the delay sustained by Eve by the second round procedure itself. The second round secret can be used to deliver a third round, and so on, at will. If Alice is ready with n computational tasks, she can divide them to (n/k) rounds, each featuring k tasks. This will on one hand shorten the life span of the shared secret from tone round life-span= $(0.5n-1)$ t, where t is Eve's computational time for a single task, to tcascade life span=$(0.5n-n/k)$ t, but Eve's chance to guess Bob's choice is reduced from pnominal guess=$1/n$ to pcascade guess=

Scaleable Log-On Security—Elaboration.

From a theoretical standpoint registered users of a remote site should identify themselves on the basis of a replaceable PIN using a protocol that denies a Man-in-the-Middle (MIM) any real chance for learning anything to help him steal the user identity, or to initiate any action with his account. PIN-plan meets this challenge using a Master One-Way function (MOW). As described elsewhere MOW is a the strongest available one-way function where the forward computational burden is controllable, and so is the size of the input string, as well the size of the output string.

The user receives a secure PIN (conveyed via a secure channel). The PIN is of sufficient length to insure that it cannot be deduced using brute force with the fastest available computers. The user further receives two short memorized PIN (memPINs): one for nominal use, and the other to signal distress. The distress memPIN (distress) is to be used if the user is coerced to logon. The logged-on establishment will know that the user is logging on under duress and will carry out the standard policy in such a case. The two memPINs are short and designed to be memorized. Apart from the distress option they provide some security against abuse in case of theft or loss of the computing device which houses the major, long PIN.

Each time the user attempts to logon, the server (the logged on party) challenges him with a random sequence, or random key (Rkey). The user would then add (concatenate or otherwise) the large, or major PIN with the memPIN and the Rkey. The combined data will serve as an input for the MOW to generate a session output, O. O will be passed on to the server as proof that the logon user is in possession of the PIN, the memPIN, and is not in distress. The size of O can be adjusted for the circumstances. If it is delivered directly from the computing device of the user to the server than it can be fairly long. The longer or larger O, the smaller the chances that a hacker would guess it right.

A special phone output will be on purpose short enough so that it can be announced on the phone by a user trying to prove his identity.

For maximum security, every allowable action on the server computer will have a standardized code. When the user requests such an action, the server will run another challenge this time the input will be comprised of the large (main) PIN, a new Rkey, and the code for the requested action. The right output will confirm that the action was requested by the bona fide user and not by the man-in-the-middle.

Private Communication Between Strangers Online

In the physical world two people may meet in a public place, strike a conversation, and decide to go to a private place where they continue their conversation. Two strangers who meet in a chat room or otherwise online, will be able to exercise the same by using the PINprivate procedure that is based on short-lived secret exchange. Using this procedure Alice and Bob, perfect online strangers will be able to develop a short lived secret which they would use to acquire a durable secret with which to maintain privacy. Alice, the initiator of the PINprivate procedure will be pre-compute n tasks for a forward computation of a one-way function. Bob will chose randomly one task, and compute it. He would them communicate the result to Alice who would know (because she pre-computed) which task Bob selected. They will both then continue and compute that task to the next computational milestone, the result of this computation will be their short lived shared secret. Eavesdropper Eve will have on average to compute 0.5n tasks to find out which task Bob selected, because Alice can make n sufficiently large, Eve will be sufficiently delayed for Bob and Alice to acquire a durable secret. They will do so by Alice communicating to Bob a secret password to a URL which contains the durable secret. The password will be communicated to Bob using their short lived shared secret. If the password is a numeric P, and the shared secret is a numeric SLS, then Alice might communicate Bob (P+SLS). Bob, knowing SLS will extract P, access that URL, copy the shared durable secret, and erase the contents of the URL. Alice and Bob will now be able to share anything that two parties with a shared durable secret can.

ClearBIT-P2P—Elaboration

Note: ClearBIT currency is currency where the value is based on bit count.

Peer-to-Peer, (P2P), performance hinges on give-and-take of the participating network nodes. In many applications there is no mechanism to enforce that balance, which can deteriorate owing to too many takers and too few givers. It would be possible to prevent this trend by introducing a closed-circle P2P-currency (P2PC), that would require takers to do some giving in order to earn P2P money to become takers. The ClearBIT currency concept is well suited to serve as such enabling currency. Giving is commonly expressed through (1) network connectivity, and through (2) data storage services. Network nodes will receive ClearBIT currency in proportion their "giving", and then pay their earned currency to use the P2P services. The ClearBIT currency attributes would provide the necessary flexibility, and implementation convenience, like: trading P2PC, working with a distributed hierarchy of ClearBIT mint nodes, to prevent an operational bottleneck at a single main node.

*: 1. INTRODUCTION

Peer-to-Peer, (P2P), has been recognized as theoretically the most efficient distribution mode for data within a network. It beats direct distribution from a single source, however broad-band, and it exhibits a powerful resistance to node-loss, and other network deterioration.

The essence of P2P is encapsulated in the fact that each network node would serve three ways:
 receiver of data
 holder of data
 sender of data This mechanism provides for a geometric progression for common transfers, and multi-route possibilities for, semi-common and unique transfers.

In a semi-common, and unique transfer, a body of data traverses from Alice, the original sender, to Bob the final receiver, through several "stepping stones" in the form of network nodes that have no interest in that data. Each stepping stone node serves as a receiver, a holder, and a sender of data that was originally issued by Alice, and its final destination is Bob.

We shall analyze this semi-common/unique P2P transfer below.

*: 1.1. SEMI-COMMON/UNIQUE P2P TRANSFER

As stated this mode is characterized by having at the extreme only two nodes, (Alice, and Bob) that have direct interest in the transferred data, while all the other (stepping stones nodes) are 'doing a favor' to Alice and Bob, enabling the transfer.

We distinguish among the following states:
 complete connectivity, unconstrained bandwidth
 complete connectivity, constrained bandwidth
 partial connectivity, constrained bandwidth In the first state, the P2P regimen would work undisturbed, and indeed most of the models assume that regimen. The second regimen would be easily negotiated by increasing the amount of interim storage, and creating more a-synchronization of the transfer. The fundamental difficulty arises in the third state. We can better understand the "partial connectivity" state by envisioning users (nodes) which connect momentarily to use the system (for receiving or transmitting as the case may be), and otherwise remain disconnected. This would essentially kill the network, and make the P2P regimen unworkable.

If connectivity is a bit better then instead of total paralysis one might encounter excessive complexity. Since every planned pathway from Alice and Bob is subject to delay or even a disconnect, it is necessary to work out a redundancy. Redundancy requires follow-up and management to cancel the other pathways, once the first pathway makes it through. Such cancellation might be more difficult then it sounds because the Internet network operated in packets which traverse in different pathways. So Alice would not necessarily know the exact trajectory of all her parallel attempts to send her file to Bob. Yet each participating node would have to be managed, and notified that its services are no longer needed. Otherwise the network would be burdened with useless traffic and the nodes would be laden with useless data. These management difficulties are directly proportional to the degree of non-connectivity among the network nodes.

*: 1.1.1. OPERATIONAL DETERIORATION

P2P applications would deteriorate as they spread because the original few participants are likely to be most of the time on-line, and provide ideal operational conditions. However, as more and more users join, the system would see the less-connected ones, which would decrease the average user connectivity. As the number of participants keeps growing, more and more users act like parasites.

*: 1.1.2. P2P News: SEMI-COMMON P2P EXAMPLE

Consider a daily news P2P service. It operates as follows: a wide range of news sources send news stories to the P2P-News operator, who compiles a "headlines file" that features link to each detailed story. The headline file is P2P distributed to participants. Each participant selects the news story he or she is interested in by clicking on the appropriate link. Periodically the P2P-News operator re-ranks the stories according to their measured popularity. The new re-ranked headlines file would be P2P released to participants. This would give participants an ongoing interest to revisit the re-ranked headline file to monitor which stories have risen in popularity. This re-ranking would in turn prompt the news sources to seek more details on the more interesting, more popular stories and add to the dynamics of the news. Then again, some users would make a point to scanning the bottom of the headline file to spot overlooked 'gems' and call attention to them. This mode would allow for a large number of unedited news items to participate in this global competition for world attention.

The idea of the P2P-News application is to deny a handful of influential editors the power to decide what is news worthy and what is not. The people, the consumers of the news, would decide with their aggregation of their individual behavior.

*: 1.1.2.1. REFRESHING MODE

When the P2P news operator compiles a new headline file, the intent is that it would be the file to distribute, not the older versions. To accomplish that the news operator might preprogram the client software to stop distributing older files. If the file at hand is older than a preset threshold—discard it, don't P2P it further.

*: 1.1.2.2. NEWS SOURCES

The headline file would be in a position to feature a large set of news sources based on some sorting algorithm that would take into account the following:
 a-priori rating
 credibility rating
 popularity rating The idea is that in the beginning the traditional sources of news would have their stories up in the headlines news file, but over time, previously unheard-of sources that prove themselves as credible, and as having stories of interest might challenge the established news sources.

The above rating of news sources would feature in determining the initial ranking of their story in the headlines news file. Their subsequent up or down movement along that file would be up to users response.

*: 1.1.2.2.1. A-PRIORI RATING

News sources may be rated according to their a-priori standing as news sources. Thus the AP, Reuters, or the Washington Post would have a high a-priori rating, but John Six-pack from Baton Rouge La. would have a poor a-priori rating.

*: 1.1.2.2.2. CREDIBILITY RATING

A source that was found to have filed an erroneous, non-true story would suffer a serious setback in his or her newsworthiness rating, and any future story would be relegated to the bottom of the headline news file.

*: 1.1.2.2.3. POPULARITY RATING

Sources that created news items that have risen in their popularity would be regarded as sources of value, and their next story would be given a high starting position in the headline news file.

On the flip side, even highly regarded news sources that come up with stories that sink in their ranking would be given a poor standing for their next story as the starting ranking position in the headline news file.

*: 1.1.2.3. HEADLINE NEWS FILE ORGANIZATION

The headline news file may become very large, featuring thousands, and tens of thousands of stories. It might be necessary to offer an organizational scheme for the headline entries, based perhaps on standard news categories (politics, health, science, entertainment, regional, etc.).

It also might be possible to allow the client software for each participant to organize the stories according to personal preference, like in "My Yahoo" or similar news pages.

*: 1.1.2.4. ATTRIBUTED POPULARITY

The per news item popularity rating may be attributed. Meaning, one could ask the file to be organized by popularity of stories where the entire Internet is counted. Every news reader anywhere in the world would be counted to compile the popularity rating of any given news item. Alternatively a client may wish to rank the headline news file according to popularity of participants in his country, his region, his profession, his sex, his special interest, etc. This would require that P2P participants identify themselves according to the attributes of interest. If they refuse to give away any particular attribute data, then they would not be counted when that attribute is counted. Thus a chemist would like to see stories that other chemists have found interesting, and clicked on. Then that chemist might reorder the current headline file to show the ranking of stories favored by residents of his home town, and finally view global ranking, all at will.

*: 1.2. NETWORK 'COMMUNISM'

Karl Marx summed up communism as an order where each would take from society according to his needs, and contribute to it, according to his abilities. This principle appears to underlie most P2P applications. Users are expected to freely contribute their connectivity and storage capacity, using their capabilities, while burdening the system with their requirements according to their needs. Communism failed because participants were more eager to apply the taking according to their needs, and less enthusiastic about shouldering to the top of their ability. This created imbalance, and eventually the takers had no pool to take from, and communism collapsed. Similarly with the current P2P regimens. Many applications cannot sustain themselves the 'communist' way.

*: 1.3. NETWORK CAPITALISM

Capitalism replaced communism everywhere (except in impoverished Cuba). Its premise: you pay for services you need, you get paid for services you provide. The idea here is to carry out the same with P2P systems. To accomplish that, it is necessary to device a fit currency, and manage it properly.

A currency would be the means to regulate the give and take, to replace the 'communist' notion with a value exchange. The currency could be a closed-circuit payment system. That is, you cannot buy this currency except by providing P2P services, and you cannot use this currency for any payment except for buying P2P services. This would create a system that denies parasites their go. Without currency, it would be possible for a certain number of parasites to only take services, providing none. With currency it would be impossible, because to get services, one needs to provide the same first.

*: 1.4. DEFINITIONS

The following definitions are important for this document:

Network, Nodes: A network, like the Internet, is a set of interconnected nodes that are capable of exchanging information. A node is an addressable entity with computing and data handling capabilities. P2P, Peer-to-Peer: A data distribution protocol where nodes in the network receive, store, and send information elements that otherwise would have to be distributed from a single or few sources to the many nodes. P2P distribution may accelerate geometrically, and thus be more efficient than any other configuration with limited bandwidth. Normally, only one of the three functions are consistent with the direct interest of the node, the others are its 'price of participation'. A node takes from the P2P regimen, or protocol, when it engages the protocol in favor of its interest (which may be send, store, or receive, as the case may be), and the node gives to the P2P regimen when it agrees to provide the other services which are not in its direct interest. P2P participants, users: Nodes that participate in the P2P protocol. bandwidth: a measure of the information throughput: bits per seconds that is associated with each node at a given time. There is always a limit: a maximum bits per seconds that can be handled by each node. Parasite: P2P participant that takes, more than it gives. P2P manager, operator: The organization that runs the P2P operation; is responsible for the client software that operates on each node, and it may be the organization that is responsible, in whole or in part, for the distributed contents. client, client software A client is a P2P participant. Normally a client would have its client software operating on its computer, interacting with client software on other nodes. digital coins: bit-strings that have an id, and represent value. ClearBIT center: The organization that handles the P2P currency, designs the digital coins, manages the client software that stores, accepts and pays them.

*:2. CLEARBIT CURRENCY

The ClearBIT currency is comprised of a bit-string that can be chopped and divided, and it carries in itself the currency value. The string can be moved around on the Internet, stored in any media, and redeemed through any redemption source, which is part of the ClearBIT Mint-Network. This P2P-currency concept would also work with account based currency, where the P2P participants would each have an account with ClearBIT or the P2P operator, and that account would manage debit and credit of the P2P currency.

*: 3. PRINCIPLES OF OPERATION

P2P participants, nodes, would have to pay for service, and would be paid for offering the same. The payment would be carried out with a dedicated P2P-currency (P2PC), which can only be earned (and accumulated) by staying connected and with a large bandwidth. Thus parasites cannot use the service.

*: 3.1. PAYING FOR SERVICE

The P2P client software would have access the bit-currency owned by that node. When initiating a service request, the client would send its parameters and its computed price to the ClearBIT center, and wait for an "OK" signal from the center to start its operation. The signal may come from any of the delegated ClearBIT operator's node. The price of the service would be commensurate with the measure of the requested services. If the request is to move data to a destination, then the amount of data would determine the cost.

*: 3.2. GETTING PAID

A P2P participant, (node), is desired to be connected for as much as possible to the net, and do so via a large bandwidth. The node would be paid according to its fulfillment of what is expected of it.

What is needed is a mechanism to measure the connectivity, and to transfer payments accordingly. Connectivity can be measured by random "needle checks" which can also be used for payment purposes. The ClearBIT center would randomly probe the connectivity status of all the participants, and if the check if positive, it would be accompanied by a quick transfer of ClearBIT money to that node.

Upon each check, the center would be able to verify bandwidth, and compute the payment accordingly. This method of payment insures that the more a node stays connected, the more it gets paid.

Nodes can also be paid per-service.

*: 3.2.1. RANDOM CONNECTIVITY CHECKS

Suppose a node is connected online a fraction f(0 ? f ? 1) of a given time frame. The fraction of positive checks, p, where the checks are given at random, would approach f as the number of checks, c approaches infinity:

$$lim(p)=f \text{ for } c??$$

And it matters not whether the connected time is one contiguous block or split up.

*: 3.2.2. PER-SERVICE PAYMENT

In the random payment method, described above, nodes are being paid in proportion to their connectivity, not directly for services to the P2P regimen. In the per-service pay mode, the nodes are being paid directly for services rendered. A node that accepts data packets, stores them for considerable amount of time, then sends them off, would accrue credit computed on the basis of such service. There is arguably greater fairness in per-service pay mode, alas it has a disadvantage for the P2P operator. High capacity, high bandwidth nodes may quickly accumulate a great deal of currency, and conclude that they need no more, and disconnect from the network, with the argument of minimizing the chances of viral contamination. In fact, some third party software would be able to effect this disconnect automatically when enough credit is accrued. This would deny the P2P operator its best operational nodes.

*: 3.2.3. PRIMING The money cycle would be primed by setting up an initiation package. Each new client would be granted an initial amount of ClearBIT currency to start using the service right away, but from that point on the new client would have to stay online in order to earn currency for his next use.

*: 3.3. VERSATILITY

This P2P-currency concept has a great deal of versatility built into it. For instance:

P2P applications Currency Links
dollar-link
lottery link
Tradechess link

This versatility options would encourage nodes to participate, even if they have no use, or extensive use for the offered P2P services. Their incentive would be to earn P2P currency which they would be able to use for another P2P application they covet, to potentially redeem that credit in dollars, or to buy lottery tickets, or for Tradechess admission fees. This exchange option would open the possibility for premium service.

*: 3.3.1. P2P APPLICATIONS CURRENCY LINKS Consider two disparate, unrelated P2P applications, each enhanced with this P2P-currency solution. Nominally, as described herein, each application would have its own "closed" currency that cannot be earned except by being connected and available to the service. Since a connected node may serve two or more P2P applications, it would make sense to link such two P2P currencies through an appropriate exchange rate. This is especially so, if the two P2P operations have a dollar link too.

*: 3.3.2. DOLLAR LINK The P2P currency can break its "closed state" and link itself to dollars or cash equivalent currency through an appropriate exchange rate. This would allow for users to make use of the system without earning the appropriate credit by being connected and available for sufficiently long time. Participants would simply buy P2P currency. This would work, if the P2P operator would offer a non-P2P service alternative. Meaning, direct connection through the P2P server. Such connection will be costly to the operator, but if the user would pay for it, it is doable.

*: 3.3.3. LOTTERY LINK

As a means to encourage connectivity and P2P participation, it would be possible to offer online lottery option where the admission fee is paid with earned P2P currency.

*: 3.3.4. TRADECHESS LINK

Tradechess is a patent-pending game-formatted trading environment where participants earn the right to buy offered merchandise against a fixed admission fee. That fee can be set to be credit points from a P2P application.

*: 3.3.5. PREMIUM SERVICES Premium services may be distinguished by (1) content, and (2) guaranteed accelerated performance. It would be possible to define the premium service as a separate P2P applications that can be accessed via P2P currency earned in a different, non-premium, service, adjusting a proper exchange rate.

*: 3.3.5.1. CONTENT-BASED PREMIUM SERVICE

Based on the nature of the non-premium P2P service, one would be able to design a contents-based premium service that would be of great interest to the participants of the non-premium service. Access to this premium service would be only through a proper exchange rate from P2P currency earned in the non-premium mode.

*: 3.3.5.2. PERFORMANCE BASED PREMIUM SERVICE

P2P is normally used to accelerate and expedite distribution of data. A premium service may be formed through a guaranteed level of performance. That means that should the P2P operation lag, or not be up to par, at a given moment, then the operator would kick-in a non-P2P distribution mode (expensive) that would accomplish the task and be consistent with the performance guarantee. Participants would pay with the non-premium P2P currency to buy that guarantee.

*: 3.4. NON-ACCOUNT BASED PAYMENT

The ClearBIT money is in the form of a bit string that carries its own value. Thus ClearBIT money can be sent over the net, can be stored anywhere, can be moved around, chopped to smaller digital coins, and can be shared, and transferred. Users would be able to load their P2P-currency on a USB stick, and use the P2P services from any desired location, node. Users in an office, with say, an Intranet, would be able to pool P2P currency so that not every computer would have to stay online, but all computers could use the P2P service. This currency sharing option would open the possibility for currency trade. Participants who accumulated a great wealth of P2P currency (by staying connected for a long time), with a great bandwidth, and with a lot of data storage made available, would be able to advertise on a dedicated board, to be put up by the ClearBIT company. Thus users who would need the currency in a hurry, and have no currency reserves would be able to purchase (for, say, dollars) the excessive currency of other users.

\*: 3.5. COIN EXPIRATION

If the ClearBIT currency, (digital coins), are allowed to remain valid indefinitely then it might lead to an operational impasse. Consider the following scenario: all the P2P participants stay on line, and virtually no one is asking for service. The participants accumulate currency on end. At some point in time, these participants all drop their connection, and come on line for a brief moment only, asking for service. The service would not be provided because there are no live participants to ride on. This 'worst case' scenario illustrates the abnormalities that might occur if the ClearBIT money is allowed to keep its value forever. Therefore, one would build in an expiration date mechanism that would insure that P2P participants would use the service more or less at the time they earn that currency.

The ClearBIT mechanism allows for each digital coin to be associated with an expiration date.

Alternatively, the client software would be able to wipe out some bits from the string, every day, or as often as desired so that the entire sum is wiped out if not used beforehand.

\*: 3.6. OPERATIONAL METRICS

The amount of P2P currency dispensed in the Net is a good measure of the P2P service activity. The more, the better. The money traffic is another metric for the same.

\*: 4. IMPLEMENTATION

The ClearBIT P2P service can be implemented in two major ways:

1. operational license
2. mint services.

\*: 4.1. OPERATIONAL LICENSE

In this mode the ClearBIT company grants the P2P service operator a license to use the ClearBIT currency on its own, setting up the actual coin, its value verification, distribution etc. This would be done against a royalty agreement that would pay ClearBIT according to level of usage.

\*: 4.2. MINT SERVICES

In this mode the P2P service operator pays the ClearBIT company for a wholesale supply of ClearBIT digital coins. The coins are marked for unique and unshared use of that P2P operator. The P2P operator takes the responsibility to get paid from service requesters, and to randomly probe the user's community for them to get paid.

In the Mint mode ClearBIT might serve several customers in tandem, and each of these customers would receive its own ClearBIT digital coins.

\*: 4.3. USER'S TRANSPARENCY

Generally the human user would be shielded from all these transactions, both at the earning end, and at the paying end. But at will he will have total visibility of his ClearBIT present and past.

Digital Exchange Control—Elaboration

Proof-of-Delivery, Cash-on-Delivery, Terms-of-Delivery
File Exchange Service add-on by a Digital Transfer Intermediary (DiTrI)

A digital transfer intermediary (DiTrI) that assumes temporary control of digital files sent between and among a given online population may upgrade its services to offer Proof-of-Delivery, Cash-on-Delivery, and Terms-of-Delivery, for a fee. (While the straightforward transfer services are offered at low cost, or free, to gain a subscriber pool for the premium services).

The upgraded services are based on a procedure regarded as Digital Exchange Control, (DEC). DEC elements are as follows:

1. DiTrI encrypts sender's file before releasing it to recipient.
2. Recipient sends DiTrI the file's hash-value as proof of receipt.
3. DiTrI verifies certain delivery conditions, and if fulfilled sends the recipient the decryption key.
4. Recipient decrypts the file to gain use of its original content.

The DEC protocol is useful in a situation where the file exchange public is comprised of mutual strangers, suffering from mutual mistrust. The protocol will put DiTrI in a position to offer the sender a proof of delivery, offer him/her cash against delivery, and offer the recipient the option to require the sender to make certain warranties and declarations before the file transfer is being consummated.

The DEC protocol achieves separation between the task of transferring the digital goods (which may be a long drawn task), and the transaction that arranges for its use. It also creates a third, disinterested party to resolve transactional disputes. The DiTrI holds the power for the recipient to use the transferred file—not the sender.

DEC may be implemented using the cryptographic framework of Daniel, and ClearBIT, products by AGS Encryptions Ltd. covered by several US Patents (granted and pending), and in particular U.S. Pat. No. 6,823,068

DEC is described in detail with respect to the following DiTrI establishments: Accelion, Prospector, Files Direct, YouSendit, SendYourFiles, ShareFile, Pando.

\*: 1. Pandonel: Pando-Daniel

Technological products and services combining the technology of Pando service and Daniel Cryptography.

Pando Silent Receipt Service (SRS)
Pando File Quality Assurance (FiQua)
Pando ClearBIT \*: 1.1. Pando-SRS: PANDO (PREMIUM) SILENT RECEIPT SERVICE Business, in general, may wish to have a proof of receipt of a digital file to the intended recipient. Requests for acknowledgement of receipt (1) may create an atmosphere of apprehension, (2) may be cumbersome, (3) are often ignored, and (4) leave open the excuse that the file was not received in its totality. This business difficulty can be solved with Pando-SRS (Silent Receipt Service) whereby a file sender would have proof of receipt in totality without the recipient having even to know about it, and at any rate without any human intervention. The idea: the file uploaded to Pando would be receipt-encrypted (different from any transport layer or peer-to-peer procedural encryption). The receipt-encrypted file would be sent to the recipient. The recipient client software would hash the received file, and send the hash value to the Pando server. The server would verify the hash, and treat this as proof of receipt in total of the encrypted file, and then react by sending to the recipient client the decryption key to unlock the receipt-encrypted file, and make the plain version available. The latter software-to-software communication would be fast, automatic, and unbeknownst to the recipient. Should the need arise for the sender to establish a proof of submission, she would request it from Pando. Pando would be in a position to issue a sworn statement to that effect, and withstand court inspection of records if necessary. Pando-SRS would be a paid-service: per transaction (high), or per period (low).

*: 1.1.1. NO-ENCRYPTION RECEIPT

The silent receipt service could in principle work without encryption. When the plain file arrives in total, the client produces its hash value, and sends it back to Pando. If the hash checks out with the value stored in Pando, then a proof of delivery is established. The point with this procedure is that for any variety of reasons the hash value may not be returned to Pando, or the hash value may not be a match (accidentally or maliciously). In all these cases there may not be a proof of delivery. Also, the sender may wish to control the identity of the recipients, and perhaps receive a warranty that they would not distribute the file further, perhaps through a different file transfer company. Without encryption, the recipient may refuse to issue the required warranties, and use the received files against the wishes of the sender. The encryption based receipt procedure serves as part of the overall DEC—Digital Exchange Control regimen, which once placed would be multi-purpose.

*: 1.2. PANDO FILE QUALITY ASSURANCE (FiQUA)

File recipients may wish to control the quality and contents of the files they receive over Pando. Examples for unwanted files are: (1) pornographic and lewd material, (2) copyright infringement material, (3) culturally offensive content, and (4) rejected disclosure. Regularly anyone can send files to anyone over Pando. Recipients who wish to protect themselves from unwanted files, and also being able to prove that they have not received, not eye-balled such an unwanted files would be able to use a premium service offered by Pando based on Pando-SRS as follows: Upon receipt of the receipt-encrypted file, the recipient would request to sender to make certain warranties about the sent file. Only when these warranties are being made, would the recipient send over the hash value and request the decryption key. If the warranties are not made, the decryption key would not be requested, and the recipient would have proof of not receiving the rejected file. For instance: a technology company receiving unsolicited ideas would need to make sure that the sender does not reveal any technology secret, for which he would later claim compensation if the company would come up with a product that ostensibly employs the disclosed technology. Using the Pando-Fiqua service the company would have proof that they have not received the sent file (never asked for the decryption key), or that the sender made the required warranties of laying no claim, and exposing no secret.

In the case of copyright theft (DRM), if a sender tries to sell stolen digital goods, the recipient would request a warranty that the file does not contain stolen digital property. If the warranty is not given, the recipient has proof of not using stolen digital goods, and would be able to turn the case to the police which will recover the contents of the file by requesting Pando's decryption key, and charge the sender, if warranted. This Fiqua request might dampen illicit trade in digital goods. Pando-Fiqua can be implemented with the recipient placing terms and conditions on the recipient before delivering the decryption key. Typical requirement would be to assure the sender that the file would not be further distributed, or that the information therein would not be put to ill use, or perhaps in case of adult movie, that it would be kept off the eyes of minors, etc.

One important application for Pando-Fiqua is in the realm of distant learning. More and more people attend classes over the Internet, and submit their homework and exams online. This reality opens troubling opportunities for fraud and mischief. With Pando-SRS every submission from a student to a professor would be held back, and left unreceived until the student indicates to Pando, per the Professor's instructions that the student warrants that this work was done without help, without violating school policies etc. The student might further warrant that if it turns out that he tried to defraud the school that he would suffer prescribed consequences.

*1.3. PANDO CLEARBIT

By decrypting Pando carried files with ClearBIT digital coins, Pando and ClearBIT would facilitate digital goods marketplace. Alice and Bob wishes to transact a digital file which Alice would sell for, say, $10.00. Alice would Pando direct the file to Bob, indicating to Pando that she sells it for $10.00. Pando would wait for Bob to indicate the id of a $10.00 coin he purchased from ClearBIT, (off-line, or on-line). Pando would send that coin-id to ClearBIT, and receive the bit image of that coin in return. Using that image, Pando would encrypt the file and Pando-send it to Bob. Bob would use his coin to decrypt the file, and make himself available to its contents. ClearBIT would credit Pando account for $10.00 minus ClearBIT service fee, and Pando would credit Alice's account with the ClearBIT transfer minus its own service fee. Alice would receive her sale price minus the ClearBIT and Pando service fees. Bob would not be able to use the same coin again since ClearBIT would mark it as used. If Bob does not own that coin, he would not be able to decrypt Alice's file.

*: 1.3.1. CLEARBIT-FIQUA COMBO

Bob would be able to use Pando-Fiqua on top of the Clear-BIT service. Meaning, the sent file would be encrypted for ClearBIT purposed, than re-encrypted for Fiqua purposes. And so Bob would not buy the file if Alice does not warrant that it is not stolen.

*: 1.3.2. QUALITY GRADIENT SALE

Using the patent pending quality gradient sale, Alice would be able to send her (big) file to Bob for free. Bob would be able to get a first decryption key at reduced price, or for free, and examine the sent file in a reduced fashion. If he likes what he sees he can pay more, get a larger key, and decrypt the same file with less loss. If he pays full price then he gets the largest key that would give him the full fledged version of the file. The reduced version (or quality gradient) may be implemented differently for different file types. Textual files may feature missing text, videos would feature low resolution as low quality etc.

*: 1.4. WHY DANIEL?

The described Pando services may be implemented using any standard cryptographic tool. However, Daniel has unique advantages 1. speed. 2. low computational burden 3. adjustable security 4. variable key size 5. cryptographic nesting Daniel is dramatically faster than anything in use today. It requires very small computational power, making it suitable for client based decryption. It features adjustable security which may be turned up to Shannon security, if necessary. Price variance may be exacted based on the degree of security provided. Daniel works with small and large key sizes without slowing down with large keys. Daniel is unique in featuring cryptographic nesting. An encrypted ciphertext C may be decrypted to low quality or partial plaintext $P1$ using key $K1$, and the same C may be decrypted to higher quality or more complete plaintext version P2, using another Daniel key K2, and so on K3, K4, . . . .

Daniel also offers extremely fast hashing technique to any desired (variable) hash size.

Daniel is covered in U.S. Pat. No. 6,823,068

*1.5. BUSINESS MODELS

Pando-SRS and Pando-Fiqua can be offered as premium service on a monthly fee, or per transaction. Pando-ClearBIT would be based on per transaction service fee.

The advantage of these premium services would be such that many small files, easily transferable by email would instead be Pando-sent.

What is claimed is:

1. A method for utilizing a digital coin, the method comprising:
   receiving a bit string, wherein a number of bits in the bit string is used to represent a coin value of the digital coin and bit values of bits of the bit string are used to determine an identity of the digital coin;
   validating the identity of the digital coin, by a node of an authentication hierarchy, wherein the validating comprises:
   comparing bit values of at least a portion of the bits of the bit string to bit values of corresponding bits of known bit strings that represent known issued digital coins; and
   checking that a matching known issued digital coin was not redeemed.

2. The method according to claim 1, further comprising splitting the digital coin to multiple digital coins, each of the multiple digital coins comprises a continuous sequence of bits that forms a portion of the bit string of the digital coin.

3. The method according to claim 1, wherein the validating the identity of the digital coin comprises validating the identity of the digital coin by evaluating values of a portion of the bits of the bit string by a node of an authentication hierarchy that differs from a mint that generated the digital coin; sending the bit string to the mint; and validating the identity of the digital coin by checking the values of all bits of the bit string.

4. The method according to claim 1, further comprising exchanging the digital coin with a new digital coin, wherein the new digital coin has a same value as the digital coin and a different bit identity than the digital coin.

5. The method according to claim 1, further comprising receiving from a seller digital goods and at least a portion of the digital coin; encrypting the digital goods with the at least portion of the digital coin; and sending the encrypted digital goods to a buyer that sent the digital coin to the seller, if the at least portion of the digital coin in successfully validated.

6. The method according to claim 1, further comprising distributing between different nodes of the authentication hierarchy values of different bits of digital strings.

7. The method according to claim 1, further comprising splitting the bit string into two or more bit strings without disturbing an order of the bit string.

8. The method according to claim 1, further comprising joining the digital coin with one or more other digital coins into a single digital coin, wherein the bit count of the single digital coin is a summation of the bit counts of the digital coin and the one or more other digital coins.

9. The method according to claim 1, further comprising storing the digital coin in a record that has a record address; and erasing the record after a first time the record has been accessed.

10. The method according to claim 9, further comprising tracking a number of accesses to the record during a predefined period and generating a notification if the number of accesses exceeded a threshold.

11. The method according to claim 1 further comprising receiving a digital coin that is signed with a private key and verifying the private key with a published public key.

12. The method according to claim 1, wherein the digital coin comprises a closed-circle peer-to-peer-currency.

13. The method according to claim 1, further comprising performing a micropayment by splitting the digital coin.

14. The method according to claim 1, wherein the receiving of the bit string is preceded by:
   preparing, by a first entity, n cryptographic keys K1, K2, . . . K11 and a corresponding list of n computational tasks T 1, T 2, . . . Tn;
   randomly selecting, by a second entity, a selected task Ti out of the n computational tasks to be computed; wherein the n computational tasks are accessible to the second entity;
   sending a result Ri of the selected task Ti to the first entity;
   recognizing by the first entity the selected task Ti based on the result Ri;
   utilizing a key Ki associated with the selected task to access the bit string by the second entity; and
   erasing the bit string;
   wherein the sending of the result, the utilizing of the key and the erasing occur within a delay period that is shorter than a period required for a third party to solve multiple tasks and to determine the selected task Ti.

15. The method according to claim 14, further comprising preventing a usage of the digital coin if detecting that multiple entities accessed the digital coin within a predefined interval of time.

16. The method according to claim 14, further comprising utilizing a durable encryption key to be shared by the first and second entities for accomplishing a private transfer of the digital coin.

* * * * *